US012717868B2

(12) United States Patent
Kirchner

(10) Patent No.: US 12,717,868 B2
(45) Date of Patent: Aug. 25, 2026

(54) METHOD AND DEVICE FOR IMPLEMENTING A MATRIX OPERATION

(71) Applicant: Robert Bosch GmbH, Stuttgart (DE)

(72) Inventor: Tobias Kirchner, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 934 days.

(21) Appl. No.: 17/289,151

(22) PCT Filed: Oct. 23, 2019

(86) PCT No.: PCT/EP2019/078869

§ 371 (c)(1),
(2) Date: Apr. 27, 2021

(87) PCT Pub. No.: WO2020/099080

PCT Pub. Date: May 22, 2020

(65) Prior Publication Data

US 2021/0382961 A1 Dec. 9, 2021

(30) Foreign Application Priority Data

Nov. 13, 2018 (DE) ......................... 102018219313.4

(51) Int. Cl.
*G06F 17/16* (2006.01)
*G06F 7/544* (2006.01)
*G06G 7/16* (2006.01)

(52) U.S. Cl.
CPC ............ *G06F 17/16* (2013.01); *G06F 7/5443* (2013.01); *G06G 7/16* (2013.01)

(58) Field of Classification Search
CPC ...... G06F 17/16; G06F 7/5442; G06F 7/5443; G06G 7/16; G06N 3/065
See application file for complete search history.

(56) References Cited

U.S. PATENT DOCUMENTS

2017/0228345 A1 8/2017 Gupta et al.
2018/0173677 A1 6/2018 Muralimanohar
(Continued)

FOREIGN PATENT DOCUMENTS

CN 105390520 A 3/2016
CN 107533858 A 1/2018
CN 108536422 A 9/2018

OTHER PUBLICATIONS

B. Feinberg et al., "Enabling Scientific Computing on Memristive Accelerators," 2018 ACM/IEEE 45th Annual International Symposium on Computer Architecture (ISCA), Los Angeles, CA, USA, Jun. 2018, pp. 367-382, doi: 10.1109/ISCA.2018.00039. (Year: 2018).*

(Continued)

*Primary Examiner* — Carlo Waje
(74) *Attorney, Agent, or Firm* — NORTON ROSE FULBRIGHT US LLP

(57) ABSTRACT

A method for implementing a matrix operation. A first digital result is determined for the matrix operation as a function of a first analog addition using a first memristor array, a second digital result being determined as a function of a second analog addition using a second memristor array, and the first result and the second result being digitally added. A device for implementing a matrix operation. The device includes at least one first memristor array and one second memristor array, a first analog-to-digital converter and a second analog-to-digital converter. The device is designed to determine a first digital result for the matrix operation as a function of a first analog addition using the first memristor array and of the first analog-to-digital converter, and to determine a second digital result as a function of a second analog addition using the second memristor array and of the second analog-to-digital converter.

29 Claims, 17 Drawing Sheets

(56) References Cited

U.S. PATENT DOCUMENTS

| | | | | |
|---|---|---|---|---|
| 2018/0373902 | A1* | 12/2018 | Muralimanohar ..... | G11C 13/00 |
| 2020/0234114 | A1* | 7/2020 | Rakshit .................. | G06N 3/065 |

OTHER PUBLICATIONS

International Search Report for PCT/EP2019/078869, Issued Jan. 29, 2020.

Athreyas et al., "Memristor-CMOS Analog Co-Processor for Acceleration of High Performance Computing Applications," International Conference on Current Trends Towards Converging Technologies (ICCTCT), IEEE, 2018, pp. 1-7.

Li et al., "A Memristor Crossbar-Based Computation Scheme With High Precision," Cornell University Library, 2016, pp. 1-6.

Hasan et al., "On-Chip Training of Memristor Based Deep Neural Networks," International Joint Conference on Neural Networks (IJCNN), IEEE, 2017, pp. 3527-3534.

Liu, et al.: "A Memristor Crossbar Based Computing Engine Optimized for High Speed and Accuracy," 2016 IEEE Computer Society Annual Symposium on VLSI (ISVLSI), pp. 110-115.

* cited by examiner 100
102
104
106
E0
E1
E2
$A_0$
$A_1$
$A_2$
j0
k0
l0
j1
k1
l1
j2
k2
l2
m1
n1
o1
m2
n2
o2
m3
n3
o3
m4
n4
o4
m5
n5
o5
1
2
4
8
16

102
104
106
E0
E1
E2
A0
A1
A2
X
j0
k0
l0
2*j1
4*j2
m1
n1
o1
m2
n2
o2
m3
n3
o3
m4
n4
o4
m5
n5
o5
1
2
4
8
16

A0
A1
A2
X
j0
k0
l0
2*j1
j2
k2
l2
104
102
106
E0
E1
E2
t1
s1
r1
t2
s2
r2
t3
s3
r3
t4
s4
r4
t5
s5
r5
o1
n1
m1
o2
n2
m2
o3
n3
m3
o4
n4
m4
o5
n5
m5
1
2
4
8
16

A0
j0
k0
l0
A1
j1
k1
l1
A2
j2
k2
l2
104
102
106
E0
E1
E2
w1
v1
u1
t1
s1
r1
u2
t2
s2
r2
u3
t3
s3
r3
o1
n1
m1
o2
n2
m2
o3
n3
m3
1
2
4

112
116
104
E0
E1
E2
$A_0$
$A_1$
$A_2$
X
j0
k0
l0
o1
n1
m1
o3
n3
m3
o5
n5
m5
1
4
16

METHOD AND DEVICE FOR IMPLEMENTING A MATRIX OPERATION

BACKGROUND INFORMATION

The mathematical determination of a scalar product from a vector and a suitably dimensioned matrix by a computer requires a very large number of additions and multiplications and, therefore, a large amount of memory space in the computer. In contrast, the calculation of scalar products with the aid of a correspondingly dimensioned matrix via in-memory computing requires less memory space. The same applies to the solving of differential equation systems.

A dedicated hardware, for example, a dot product engine, is used for such applications.

In contrast to the related art, it is desirable to provide a more efficient option for carrying out such calculations.

SUMMARY

This may be achieved by example embodiments of the present invention.

In accordance with an example embodiment of the present invention, a corresponding method for implementing a matrix operation provides that a first digital result is determined for the matrix operation as a function of a first analog addition with the aid of a first memristor array, a second digital result being determined as a result of a second analog addition with the aid of a second memristor array and the first result and the second result being digitally added. The analog additions in various memristor arrays enable a rapid calculation of the analog results. The matrix operation is completed with the digital addition of the analog results and provided for further processing.

In accordance with an example embodiment of the present invention, it is preferably provided that the first digital result is determined as a function of a first analog result, the second digital result being determined as a function of a second analog result, the analog results being determined at least partially in a temporally overlapping manner. This parallelization accelerates the calculation.

In accordance with an example embodiment of the present invention, it is preferably provided that a first voltage is applied at a first memristor of the first memristor array, a second voltage being applied at least partially in a temporally overlapping manner thereto at a second memristor of the second memristor array, a first total current, which characterizes the current flow through the first memristor and through the second memristor, being detected at a first output of the first memristor array, the first voltage being applied at least partially in a temporally overlapping manner thereto at a third memristor of the second memristor array, the second voltage or a third voltage being applied at least partially in a temporally overlapping manner thereto at a fourth memristor of the second memristor array, a second total current, which characterizes the current flow through the third memristor and through the fourth memristor, being detected at a second output of the second memristor array, the result being determined as a function of the first total current and of the second total current. The calculation of a matrix multiplication is accelerated due to a high degree of parallelization.

In accordance with an example embodiment of the present invention, it is preferably provided that the first voltage is defined as a function of a first element of a first matrix, the second voltage being defined as a function of a second element of the first matrix, a first resistance value of the first memristor being defined as a function of a first element of a second matrix, a second resistance value of the second memristor being defined as a function of a second element of the second matrix, and the result characterizing a scalar product of the matrices. The calculation of a scalar product is very rapidly implementable due to a high degree of parallelization.

In accordance with an example embodiment of the present invention, it is preferably provided that at least one resistance value of a memristor is programmed as a function of one element of the second matrix. In this way, the arrangement for new calculations is easily initiated.

In accordance with an example embodiment of the present invention, it is preferably provided that the resistance value of at least two memristors is defined or programmed as a function of one element of the second matrix. The same matrix is used multiple times in the arrangement for parallelization. This further accelerates the acceleration.

In accordance with an example embodiment of the present invention, it is preferably provided that a plurality of memristors is situated in a matrix array, the second matrix or a plurality of second matrices defining an array of resistance values for the plurality of the memristors, and a memristor including the resistance value in the matrix array, or being programmed with the resistance value, which in the array of the resistance value corresponds to its position in the matrix array, in particular, with respect to its indices. This assignment is particularly transparent.

In accordance with an example embodiment of the present invention, it is preferably provided that at least two groups of memristors include resistance values or are programmed with resistance values, which are defined according to the elements of the same second matrix. The grouping significantly facilitates the assignment.

In accordance with an example embodiment of the present invention, it is preferably provided that the at least one part of the memristors made upon of the at least two groups of memristors is used in the matrix arrangement for determining the same total current. The matrices are mapped among one another in the same row. As a result, low-resolution analog-to-digital converters are usable.

In accordance with an example embodiment of the present invention, it is preferably provided that at least one of the memristors from one of the at least two groups of memristors in the matrix arrangement is ignored by memristors of the other of the at least two groups when determining the total current. In this way it is possible to fully utilize high-resolution analog-to-digital converters.

In accordance with an example embodiment of the present invention, it is preferably provided that the first voltage is an analog signal, which is generated by a digital-to-analog converter as a function of a digital signal, which is defined by the first element of the first matrix and/or that the second voltage is an analog signal, which is generated by a digital-to-analog converter as a function of a digital signal, which is defined by the second element of the first matrix. Thus, the input variables for the calculation are generated particularly skillfully.

In accordance with an example embodiment of the present invention, it is preferably provided that the first voltage and the second voltage differ by one factor, in particular by a power of 2, which is defined in particular as a function of a resolution of the analog-to-digital converter or as function of a bit factor decomposition underlying the matrix operation. Thus, a resolution of the signal may be influenced, in particular, as a function of a resolution of the analog-todigital converter. The factor may also differ as a function of whether a 1 bit or a 2 bit decomposition of the underlying matrix operation is present.

In accordance with an example embodiment of the present invention, it is preferably provided that the first total current includes at least one first current and one second current, the first current flowing through the first memristor when the first voltage is applied at the first memristor, and the second current flowing through the second memristor when the second voltage is applied at the second memristor. This is a particularly favorable consideration of the individual currents.

In accordance with an example embodiment of the present invention, it is preferably provided that the first voltage is applied at the same time to at the first memristor and at a third memristor or the second voltage being applied at the same time at at least the second memristor and at a fourth memristor, a first total current being detected for the current by the first memristor and by the second memristor, a second total current for the current being detected by the third memristor and/or by the fourth memristor, and the result being determined as a function of the first total current and of the second total current. This makes it possible to evaluate multiple calculations in parallel.

In accordance with an example embodiment of the present invention, it is preferably provided that a digital signal, which defines a value of at least one bit is determined by an analog-to-digital converter as a function of the total current. Thus, the values for the registers of a memory are determined particularly skillfully.

In accordance with an example embodiment of the present invention, it is preferably provided that a plurality of total currents is determined, a plurality of bits being determined as a function of the plurality of total currents, at least one bit, which is defined as a function of one of the total currents being added to at least one bit, which is defined by another of the total currents. The resolution is variable by adding one bit each to another bit or by simultaneously adding multiple bits to multiple bits.

In accordance with an example embodiment of the present invention, it is preferably provided that at least one of the bits in one register is shifted to be situated with respect to a least significant bit of the result in the direction of the most significant bit of the result before the addition with the other bit from another register. In this way, an activation of individual memristors with an increased voltage is possible, which allows the resolution of the analog-to-digital converters to be reduced.

In accordance with an example embodiment of the present invention, it is preferably provided that at least one of the bits in one register is situated before the addition with the other bit from another register adjacent to the other bit with respect to a least significant bit of the result. In this way, the space in the register is utilized in a particularly efficient manner.

In accordance with an example embodiment of the present invention, it is preferably provided that a plurality of memristors is situated in a matrix array, the second matrix or a plurality of second matrices defining an array of resistance values for the plurality of the memristors, and one memristor in the matrix array including the resistance value or being programmed with the resistance value, which corresponds in the array of the resistance values to its position in the matrix array, in particular, with respect to its indices. This assignment is representable in a particularly simple manner.

In accordance with an example embodiment of the present invention, a device for implementing a matrix operation includes a first memristor array and a second memristor array, the device including a first analog-to-digital converter and a second analog-to-digital converter, and the device being designed to determine for the matrix operation a first digital result as a function of a first analog addition with the aid of the first memristor array and of the first analog-to-digital converter, and to determine a second digital result as a function of a second analog addition with the aid of the second memristor array and of the second analog-to-digital converter. This device enables a rapid calculation of the matrix operation.

In accordance with an example embodiment of the present invention, it is preferably provided that a first voltage is applicable at a first memristor of the memristor array, a second voltage being applicable at least partially in a temporally overlapping manner thereto at a second memristor of the memristor array, a first total current, which characterizes the current flow through the first memristor and the second memristor, being detectable at a first output of the memristor array, the first voltage being applicable at least partially in a temporally overlapping manner thereto at a third memristor of the memristor array, the second voltage being applicable at least partially in a temporally overlapping manner thereto at a fourth memristor of the memristor array, a second total current, which characterizes the current flow through the third memristor and the fourth memristor, being detectable at a second output of the memristor array.

In accordance with an example embodiment of the present invention, it is preferably provided that a plurality of memristor arrays forms a matrix array. This is representable in a particularly efficient manner.

In accordance with an example embodiment of the present invention, it is preferably provided that the digital-to-analog converters are designed to detect information about the at least one total current.

In accordance with an example embodiment of the present invention, it is preferably provided that the device includes a first analog-to-digital converter for generating the first voltage and a second analog-to-digital converter for generating the second voltage. This device is therefore more easily activatable.

In accordance with an example embodiment of the present invention, it is preferably provided that the device provides a memristor array, in which two memristors, which are variable in a direction opposite one another with respect to their charge-dependent resistance values, are situated at a node of a row and of a column of the matrix array.

In accordance with an example embodiment of the present invention, for activation, a device is provided, which includes a microprocessor, a switching unit and, in particular, a memory including registers.

BRIEF DESCRIPTION OF THE DRAWINGS

Further advantageous specific embodiments result from the following description and from the figures.

DETAILED DESCRIPTION OF EXAMPLE EMBODIMENTS

In the description below, memristor refers to an electronic component, whose resistance is variable as a result of a current flow if a voltage applied at the memristor exceeds a threshold value. The memristor is programmed to a particular resistance value, for example, via an iterative algorithm, which applies voltage pulses at the memristor having a defined height, duration and shape. After each voltage pulse, it is preferably checked via a calculation whether the memristor has reached its target value for the resistance value.

With such an algorithm, it is possible to program memristors only for few discrete resistance values with a sufficient degree of accuracy. For this purpose, digitally encoded resistance values, for example, are converted by a digital-to-analog converter into a corresponding voltage pulse. To calculate the resistance value after each voltage pulse, an analog current signal is detected as an analog result and digitized by an analog-to-digital converter. The accuracy of the digitized result is a function of the quality of the analog-to-digital converter, with which the analog result after completed calculation is converted back again into the digital range. Based on the conversion of the values from digital to analog and back, it is assumed that the calculations are subject to a certain uncertainty. This is attributable to conversion errors such as digital residual errors or non-linearities of the converters. Noise may also adversely affect the result, in particular, when the resolution of the converters is high.

Memristors may be used for a plurality of effects. A physical system in which the effect is used, includes a variable resistance, which is influenced by a current flow to the memristor or to the memristors in the past.

The memristors may be situated in the physical system in a matrix of a dimension n×m and used as coefficients or weights of a mathematical matrix of the same dimension n×m. The memristors in such a physical system form a memory for coefficients or weights.

Economical physical systems are representable with memristors due to their very minimal space requirement. Analog-to-digital converters and digital-to-analog converters do not have these advantages. The accuracy of the physical system in this regard is significantly a function of the achievable resolution of the memristor values and of the quality and, therefore of the costs of the analog-to-digital converters and of the digital-to-analog converters.

Figure 1:
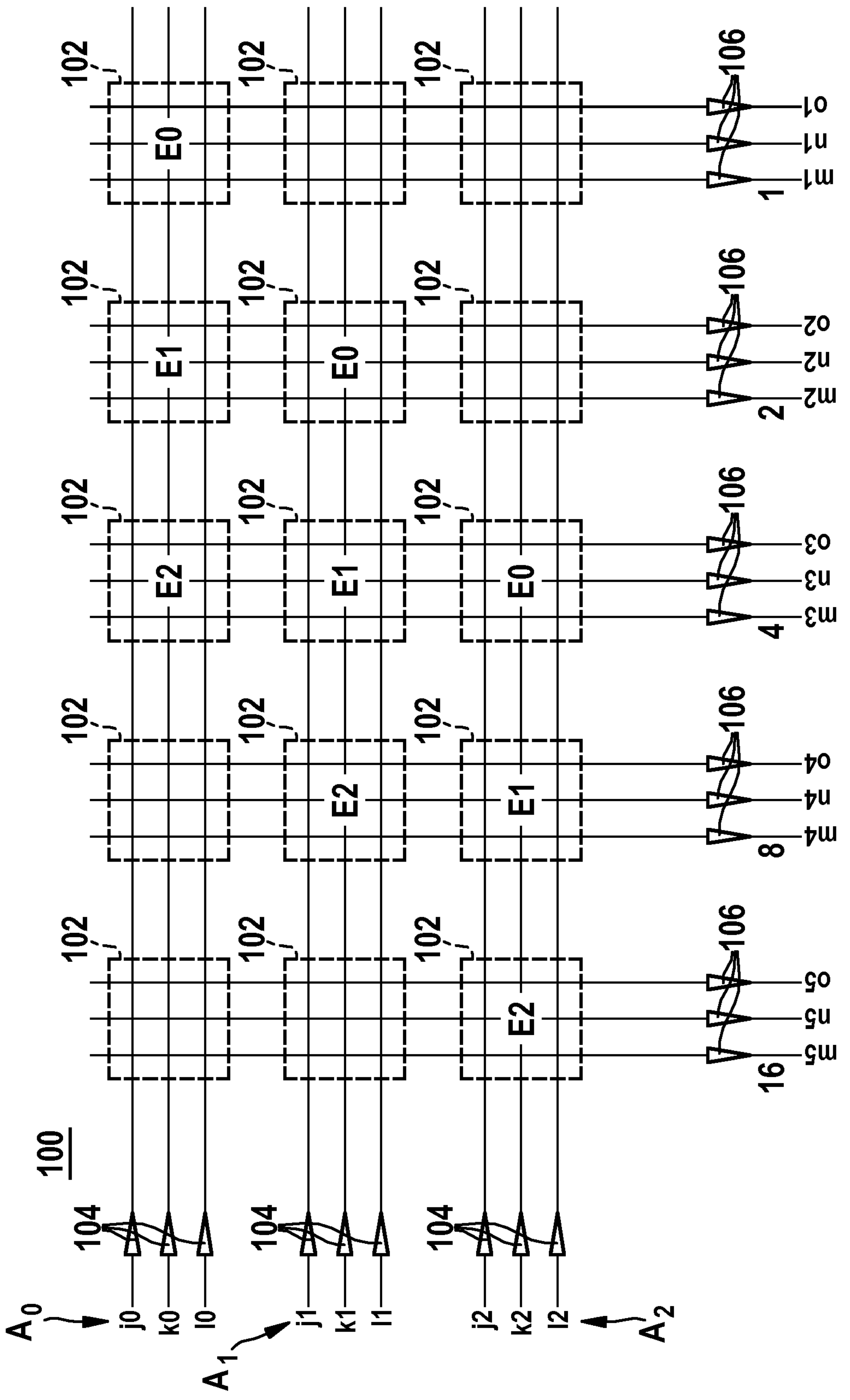
FIG. 1 schematically shows a matrix array, in accordance with an example embodiment of the present invention.

A matrix array 100 for a device for implementing a matrix operation, for example, a matrix multiplication, is schematically represented by way of example in FIG. 1.

Figure 2:
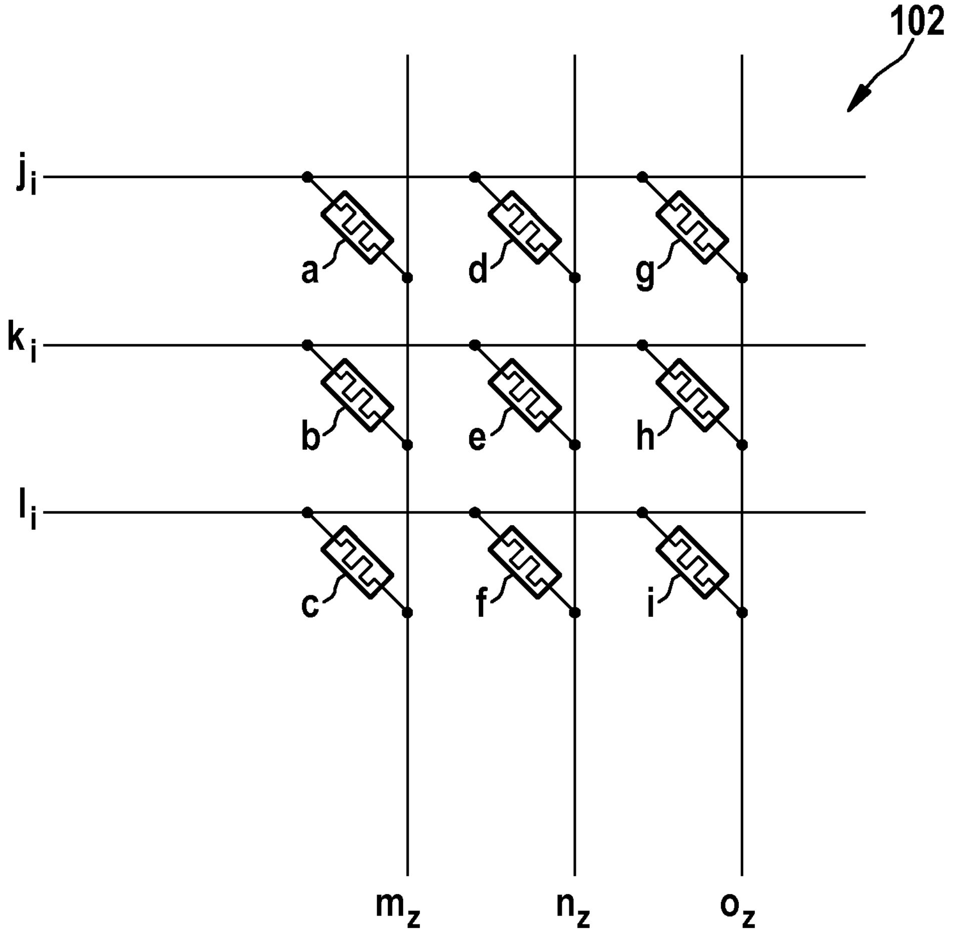
FIG. 2 schematically shows a memristor array, in accordance with an example embodiment of the present invention.

Matrix array 100 includes a plurality of memristor arrays 102, whose structure is represented in detail in FIG. 2 as exemplified by a memristor array 102.

Memristors that are situated with their first terminal at a shared row line form a memristor array.

A memristor array 102 in the example includes, as is also depicted in FIG. 2, nine memristors a, . . . i. A first memristor a is situated between a first row line ji and a first column line mz. A second memristor b is situated between a second row line ki and first column line mz. A third memristor c is situated between a third row line li and first column line mz. A fourth memristor d is situated between first row line ji and a second column line nz. A fifth memristor e is situated between second row line ki and second column line nz. A sixth memristor f is situated between third row line li and second column line nz. A seventh memristor g is situated between first row line ji and a third column line oz. An eighth memristor h is situated between second row line ki and third column line oz. A ninth memristor i is situated between third row line li and third column line oz.

Memristor array 102 in the example forms a symmetrical memristor matrix of the dimension 3×3. The dimension may be larger or smaller. The memristor matrix may be asymmetrical.

Matrix array 100 in the example includes fifteen memristor arrays 102, which are situated in three rows and five columns. Memristors of memristor arrays 102 of the first row of matrix array 100 situated in the same row of the memristor matrix use the same first row line and are connected to a first input j0. Memristors of memristor arrays 102 of the second row of matrix array 100 situated in the same row of the memristor matrix use the same second row line and are connected to a first input k0. Memristors of memristor arrays 102 of the third row of matrix array 100 situated in the same row of the memristor matrix use the same third row line and are connected to a first input I0. Memristors of memristor arrays 102 of the first column of matrix array 100 situated in the same column of the memristor matrix use the same first column line and are connected to a first output m5. Memristors of memristor arrays 102 of the second column of matrix array 100 situated in the same column of the memristor matrix use the same second column line and are connected to a second output n5. Memristors of memristor arrays 102 of the third column of matrix array 100 situated in the same column of the memristor matrix use the same third column line and are connected to a second output o5.

The remaining memristor arrays 102 of matrix array 100 are connected according to this circuit diagram to the inputs j1, k1, l1, j2, k2, l2, and to the outputs m4, n4, o4, m3, n3, o3, m2, n2, o2, m1, n1, o1.

Index i depicted in FIG. 2 in general indicates for a memristor array 102 the row in matrix array 100 in which this memristor array 102 is situated. Index z depicted in FIG. 2 characterizes for a memristor array 102 the column in matrix array 100, in which this memristor array 102 is situated. In the example, the first column of matrix array 100 is assigned to the most significant bit, MSB, of a result of the calculation. In the example, the last column of matrix array 100 is assigned to the least significant bit, LSB, of the result of the calculation. Every three adjacent outputs of the outputs depicted in FIG. 1 that are identified with the same index, are grouped as columns. The columns are assigned factors 16, 8, 4, 2, 1 from the first column on the left to the last column on the right. These indicate the power of 2, with which the result of the analog summation of a column is taken into account in the digital summation for the result. For example, the factors are defined as a function of the bit factor decomposition that underlies the matrix operation.

A digital-to-analog converter 104, which supplies a memristor array with an input voltage, is situated in the example at each of the row lines. If the calculations are carried out binarily, digital-to-analog converters 104 are omitted. Digital-to-analog converter 104 must be able to map the column current. The column current represents the sum of the maximum weights in a column. In this case, it is taken into account that in some designs the row voltage for the column is already provided with a factor. A digital-to-analog converter 106 is situated at each of the column lines. Analog-to-digital converters 106, which read out the analog results, require a resolution adapted in accordance with the size of the memristor matrix and in accordance with the bit width of the input variables in order to digitally output the output values at their outputs with sufficient resolution. In a 4×4 matrix, for example, four values per column are added, so that digital-to-analog converter 106 in this case must cover a value range at least 4 times as great. If the line voltage is already allocated a factor, the value range must be designed correspondingly larger. This corresponds to a value range 2 bit times as large. The factors that are assigned to the columns may also be designed as a function of the resolution of the digital-to analog converters. This may necessitate an adaptation of the input voltages described below.

The inputs of digital-to-analog converters 104 and the outputs of analog-to-digital converters 106 in the example are combined into groups of rows or columns as described below, and thus designed to carry out the following calculation.

Using this approach, it is possible to compute the calculations that relate to a matrix with arbitrary accuracies. As described below, both input values as well as weights of the matrix are decomposed into individual bits. In the example, an input value of 0x03 is decomposed into 1 bit factors and corresponds then to 0*2ˆ2+1*2ˆ1+1*2ˆ0.

According to this approach, the entire matrix operation is written out in full. For example, a matrix operation including 3 bit wide input values and 3 bit weights may be decomposed into 81 matrix operations including 1 bit each, all matrix operations being carried out simultaneously.

For this purpose, 81 memristors are simultaneously required. The digital-to-analog converters and analog-to-digital converters used must resolve only a few stages.

The matrix may be flexibly designed with respect to the resolution of the components. This means:

The resolution of digital-to-analog converters and analog-to-digital converters are scalable. The matrix may, for example, be dimensioned in such a way that many analog-to-digital converters are used, which operate with lower resolution or vice versa.

If a speed of the analog-to-digital converters used is more rapidly selected as compared to a speed of a reaction of the matrix, i.e., of its components or elements, or if the analog-to-digital converters used and the matrix used allow it, it is provided in one aspect to multiplex the analog-to-digital converters. The multiplexing may take place within the matrix or also at other matrices in the memory.

The memristors may be operated stably and independently of the temperature, because the number of states may be reduced.

In a binary operation, the digital-to-analog converters are omitted. In the binary operation, the analog-to-digital converters require only n-stages of resolution in a matrix of the dimension n×n. In a binary operation, the memristors each require only two states, i.e., 1 bit. In a binary operation, the memristors may be very quickly programmed, in particular, without a repetitive algorithm.

Matrix array 100 is arbitrarily scalable. The number of matrices is a linear function of the resolution of the weights. One matrix per bit is used in the example. For a matrix of the dimension 3×3 including 3 bit input values and 3 bit output values, a circuit configuration including 3 matrices is suitable, for example, each of which is used three times for a calculation. The number of additional iterations is a function of the resolution of the input values. In the example, one iteration step per bit is provided. The use of higher-resolution memristors is equally possible.

If memristors including more than one bit resolution are programmable, then the number of matrices is reduced accordingly.

To activate the matrix array, a matrix operation is decomposed into binary components. This is described below with reference to a matrix of the dimension 3×3 and a vector of the dimension 3×1.

The desired matrix operation is initially decomposed into individual bits $$\begin{bmatrix} a & b & c \\ d & e & f \\ g & h & i \end{bmatrix} * \begin{bmatrix} j \\ k \\ l \end{bmatrix} =$$

$$\begin{bmatrix} a_0 2^0 + a_1 2^1 + a_2 2^2 + \cdots & d_0 2^0 + d_1 2^1 + \cdots & g_0 2^0 + \cdots \\ b_0 2^0 + b_1 2^1 + b_2 2^2 + \cdots & e_0 2^0 + e_1 2^1 + \cdots & h_0 2^0 + \cdots \\ c_0 2^0 + c_1 2^1 + c_2 2^2 + \cdots & f_0 2^0 + f_1 2^1 + \cdots & i_0 2^0 + \cdots \end{bmatrix} * \begin{bmatrix} j_0 2^0 + j_1 2^1 + \cdots \\ k_0 2^0 + k_1 2^1 + \cdots \\ l_0 2^0 + l_1 2^1 + \cdots \end{bmatrix}$$

The 2s factors are then factored out so that, for example, the result for 3 bit resolved values is $$\left(2^0\begin{bmatrix} a_0 & b_0 & c_0 \\ d_0 & e_0 & f_0 \\ g_0 & h_0 & i_0 \end{bmatrix} + 2^1\begin{bmatrix} a_1 & b_1 & c_1 \\ d_1 & e_1 & f_1 \\ g_1 & h_1 & i_1 \end{bmatrix} + 2^2\begin{bmatrix} a_2 & b_2 & c_2 \\ d_2 & e_2 & f_2 \\ g_2 & h_2 & i_2 \end{bmatrix}\right) * \left(2^0\begin{bmatrix} j_0 \\ k_0 \\ l_0 \end{bmatrix} + 2^1\begin{bmatrix} j_1 \\ k_1 \\ l_1 \end{bmatrix} + 2^2\begin{bmatrix} j_2 \\ k_2 \\ l_2 \end{bmatrix}\right)$$

Substituting the matrices $$\begin{bmatrix} a_0 & b_0 & c_0 \\ d_0 & e_0 & f_0 \\ g_0 & h_0 & i_0 \end{bmatrix} \text{ with } E0, \ldots$$

results in $$(2^0[E_0] + 2^1[E_1] + 2^2[E_2]) * (2^0[A_0] + 2^1[A_1] + 2^2[A_2]) = E_0A_02^0 + E_0A_12^1 + E_0A_22^2 + E_1A_02^1 + E_1A_12^2 + E_1A_22^3 + E_2A_02^2 + E_2A_12^3 + E_2A_22^4$$

FIG. 1 illustrates an activation of matrix array 100 for calculating this product. More precisely, the memristors are initially assigned with the values from matrices E0, E1, E2 at the nodes depicted in FIG. 1, i.e., the memristors are programmed accordingly. The values from rows of respective matrices E0, E1, E2 in the example are programmed as resistance values or conductance values in columns of memristor arrays 102, as depicted in FIG. 2. In FIG. 1, the assignment of respective matrices E0, E1, E2 to the array in the hardware of matrix array 100 is identified with the same index. The input values of the inputs identified in FIG. 1 with j0, j1, j2, k0, k1, k2, l0, l1, l2 are then allocated the values of vectors A0, A1, A2 of the same index. This means digital-to-analog converters 104 of these inputs apply a corresponding voltage. More precisely, no voltage is applied in the example, due to the bit decomposition for logic 0. A voltage higher in comparison is applied for logic 1.

Such a matrix array 100 is a memory made up of memristors. If computing operations, i.e., in-memory computing, are carried out with this memory, then the memory locations, i.e., the memristors, are initially written accordingly. A voltage is subsequently applied at a row of the matrix. A column is connected to ground temporally at least partially overlapping therewith. The current that flows through the memristor at the nodal point of this row and of this column to ground point is a function of a resistance value Rnode of the memristor as of: I=U/Rnode.

If voltages are applied simultaneously at multiple rows and only one row is again connected to ground, then a current Urow*1Rnode flows through each memristor of this column. In the example, multiple rows are activated combined in groups [j0, k0, l0] [j1, k1, l1] and [j2, k2, l2].

At the ground point, i.e., in the example on the column line close to analog-to-digital converter 106 of the column connected to ground, these currents are then added so that for the memristors having the resistance values Ra, Rb, . . . , that are situated at nodal points of the rows with this column, the following total current results when a voltage $U_{row}$ is applied at each of these rows:

$$I_{Sum} = U_j * \frac{1}{R_a} + U_k * \frac{1}{R_b} + \cdots$$

The terms involve a sum of divisions. If instead of this representation, the corresponding conductance values are used, a sum of products is evaluated. If, in addition, it is assumed that voltage $U_{row}$ applied at one row is the same over the entire row, and if multiple columns are simultaneously connected to ground, multiple of these operations may thus be carried out simultaneously.

Figure 3:
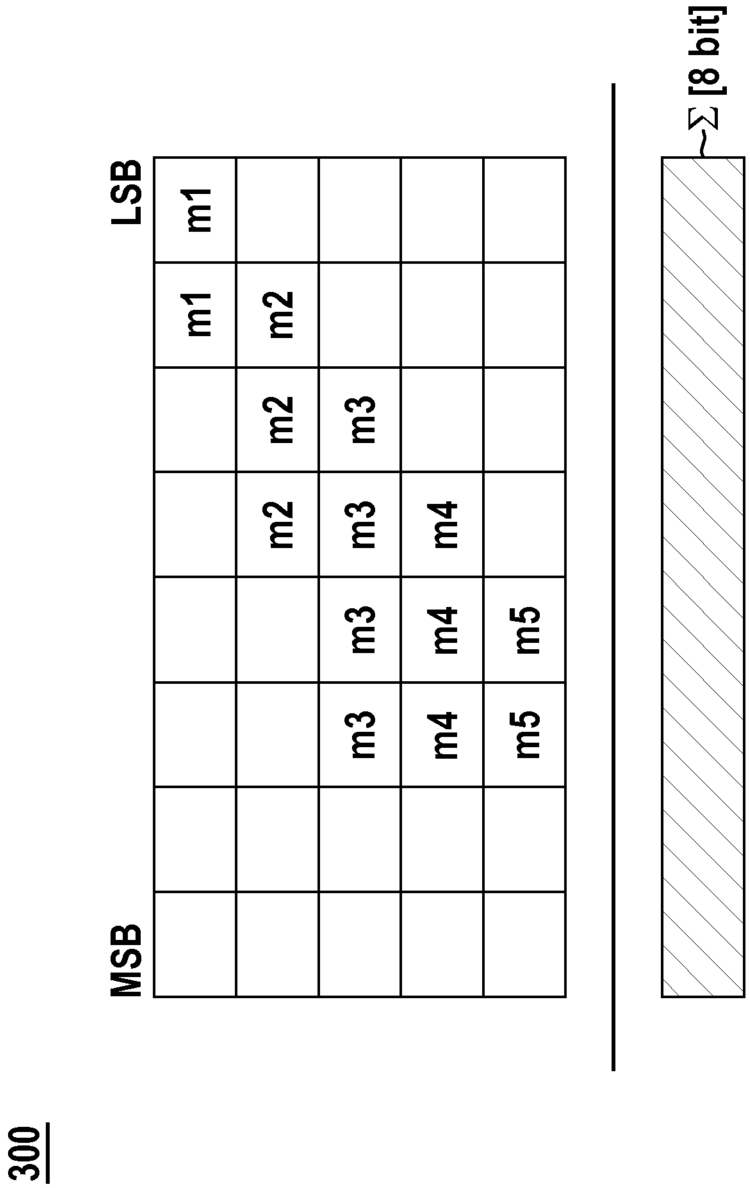
FIG. 3 shows a first calculation diagram, in accordance with an example embodiment of the present invention.

The resulting total current represents the analog result of this calculation for the column line under consideration and is detected in the example by respective analog-to-digital converter 106. Analog-to-digital converter 106 preferably has a virtual zero point. This means that the columns are not actually connected to ground. The ground potential is provided via the virtual zero point. Analog-to-digital converter 106 is a transimpedance amplifier, for example. The digital result of this calculation is a sum Σ in the example of the length of 8 bits, is determined for each of scalars j, k, l according to a calculation diagram 300 depicted by way of example in FIG. 3 for scalar j.

The digitized results of the column lines that are assigned to scalar j are identified in the example starting from the left of the first column of matrix array 100 with m5, m4, m3, m2 and m1. The digitized results are situated in rows in FIG. 3. In one row in the example, there is space for 8 bits between a MSB of the sum depicted to the left in FIG. 3 and a LSB of the sum depicted to the right in FIG. 3. Corresponding registers, for example, are provided in a memory, into which the respective digitized result is written. A first digitized results m1 of the last column of matrix array 100 is situated in the first row. First digitized result m1 provides two bits and is situated at the LSB of sum Σ. A second digitized result m2 of the penultimate column provides three bits, whose LSB is shifted to be situated with respect to the LSB of sum Σ by four bits toward the MSB of sum Σ. A third digitized result m3 of the third column provides four bits, whose LSB is shifted to be situated with respect to the LSB of sum Σ by two bits toward the MSB of sum Σ. A fourth digitized result m4 of the second column provides three bits, whose LSB is shifted to be situated with respect to the LSB of sum Σ by three bits toward the MSB of sum Σ. A fifth digitized result m1*m*5 of the first column provides two bits, whose LSB is shifted to be situated with respect to the LSB of sum Σ by four bits toward the MSB of sum Σ. The result of the calculation is determined as an 8 bit sum Σ by summation across the columns of first calculation diagram 300.

Figure 4:
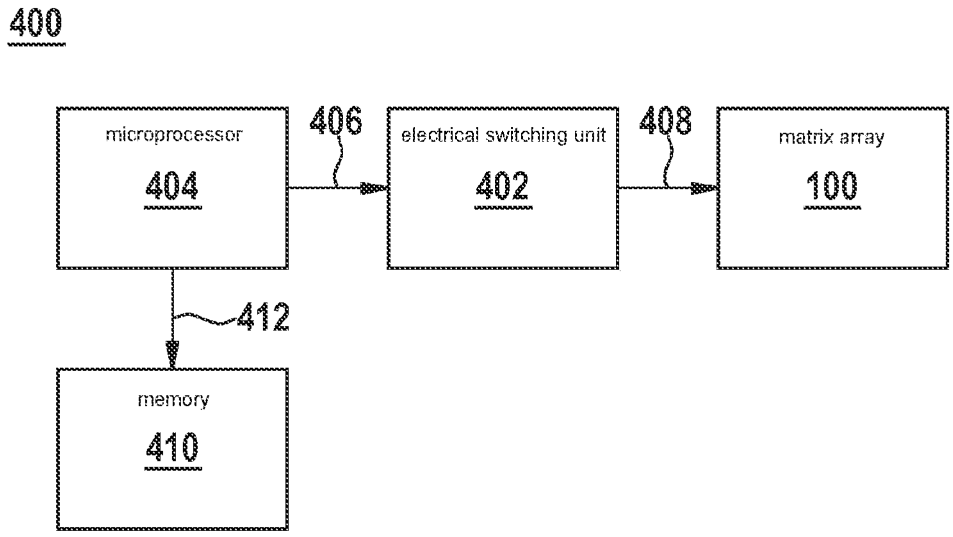
FIG. 4 schematically shows an electrical circuit, in accordance with an example embodiment of the present invention.

FIG. 4 schematically represents an electrical circuit 400 for activating digital-to-analog converters 104 for applying voltage to the row lines, and for activating analog-to-digital converters 106 for detecting the resulting current at the column lines. In the example, at least one electrical switching unit 402 is implemented, which is switchable by a microprocessor 404 via at least one signal line 406. For example, barrier field-effect transistors are used in the example as electrical switches in switching unit 402. Matrix array 100 is connected via at least one corresponding power supply 408 to switching unit 402. A memory 410 including registers for the calculation is connected to microprocessor 404 via a data bus 412.

Microprocessor 404 is designed to activate matrix array 100 according to the described method in order to carry out the calculation.

Figure 5:
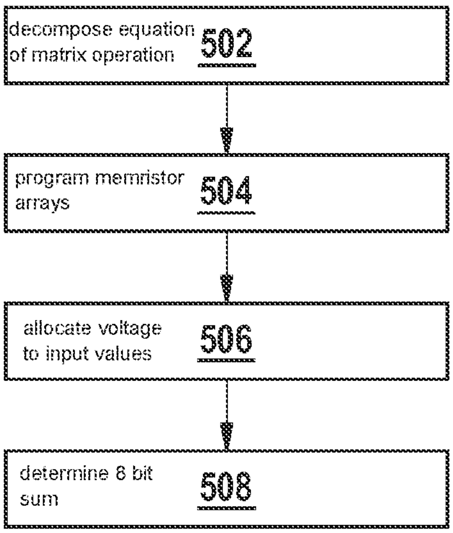
FIG. 5 shows steps in a method for calculation, in accordance with an example embodiment of the present invention.

The sequence of the method is schematically depicted in FIG. 5. In a step 502, the equation of a matrix operation to be solved is decomposed. More precisely, matrices E0, E1, E2 are determined.

A step 504 is subsequently carried out.

In step 504, memristor arrays 102 of matrix array 100 are programmed for the calculation. In the example, the memristors are programed according to the values from matrices E0, E1, E2. The circuit configuration including 3 matrices, each of which is used three times for a calculation, is suitable for the matrix of the dimension 3×3 including 3 bit input values and 3 bit output values. One possible implementation is depicted in FIG. 1, in which the assignment of memristor array 102 to matrices E0, E1, E1 is identified with E0, E1, E2. All matrix multiplications that are multiplied by the same factor are situated in the example among one another, i.e., the memristors are selected and programmed by corresponding activation. A high resistance value means, for example, logic 1 and a resistance value lower by comparison means, for example, logic 0.

A step 506 is subsequently carried out.

In step 506, the input values of the inputs identified with j0, j1, j2, k0, k1, k2, l0, l1, l2 are allocated a voltage according to the input values of the inputs identified with j0, j1, j2, k0, k1, k2, l0, l1, l2. This means, digital-to-analog converters 104 of these inputs apply a corresponding voltage.

The resulting total current is determined at least partially in a temporally overlapping manner therewith as an analog result of the calculation at the corresponding column lines. The total current of the respectively considered column line is detected in the example by respective analog-to-digital converter 106. The digital result in the example is written according to first calculation diagram 300 at the corresponding position into the register for determining sum Σ.

In the example, groups [j0, k0, l0], [j1, k1, l1] and [j2, k2, l2] are activated in a combined manner and the digital result for the corresponding column lines is determined.

A step 508 is subsequently carried out.

In step 508, the 8 bit sum Σ is determined as the result of the calculation for each of scalars j, k, l.

According to this approach, the entire matrix operation is written out in full. For example, a matrix operation including 3 bit wide input values and 3 bit weights may be decomposed into 81 matrix operations, each including 1 bit, all matrix operations being carried out simultaneously.

Figure 6:
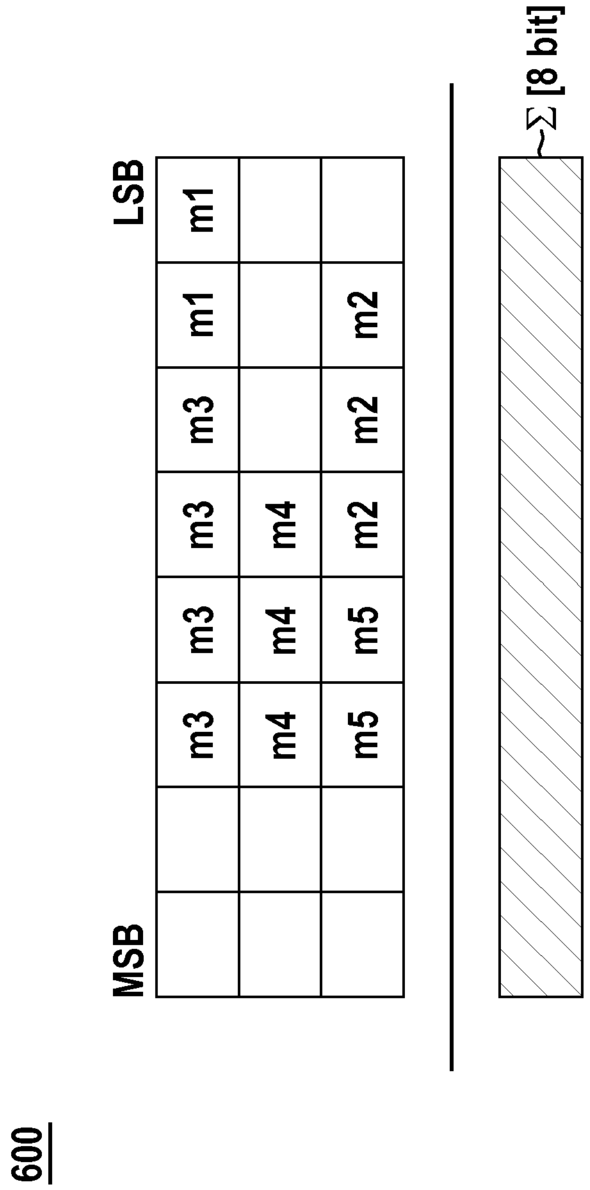
FIG. 6 shows a second calculation diagram, in accordance with an example embodiment of the present invention.

FIG. 6 represents a second calculation diagram 600. The implementation of the calculation according to second calculation diagram 600 further optimizes the previously described approach in that a number of required registers is reduced. In contrast to first calculation diagram 300, first digitized result m1 and third digitized result m3 are situated in the same row. In contrast to first calculation diagram 300 second digitized result m2 and fifth digitized result m5 are situated in the same row. The remainder of the approach is as described for first calculation diagram 300.

In these calculations, some memristors are not utilized in an otherwise regular matrix array 100. These calculations place uneven demands on digital-to-analog converters 106 used.

Digital-to-analog converter 106 for determining output value m3 is designed to resolve four bits, digital-to-analog converters 106 for determining output value m4 and m2 in the example are designed to resolve 3 bits. The other digital-to-analog converters 106 in the example are designed to resolve only two bits.

Figure 7:
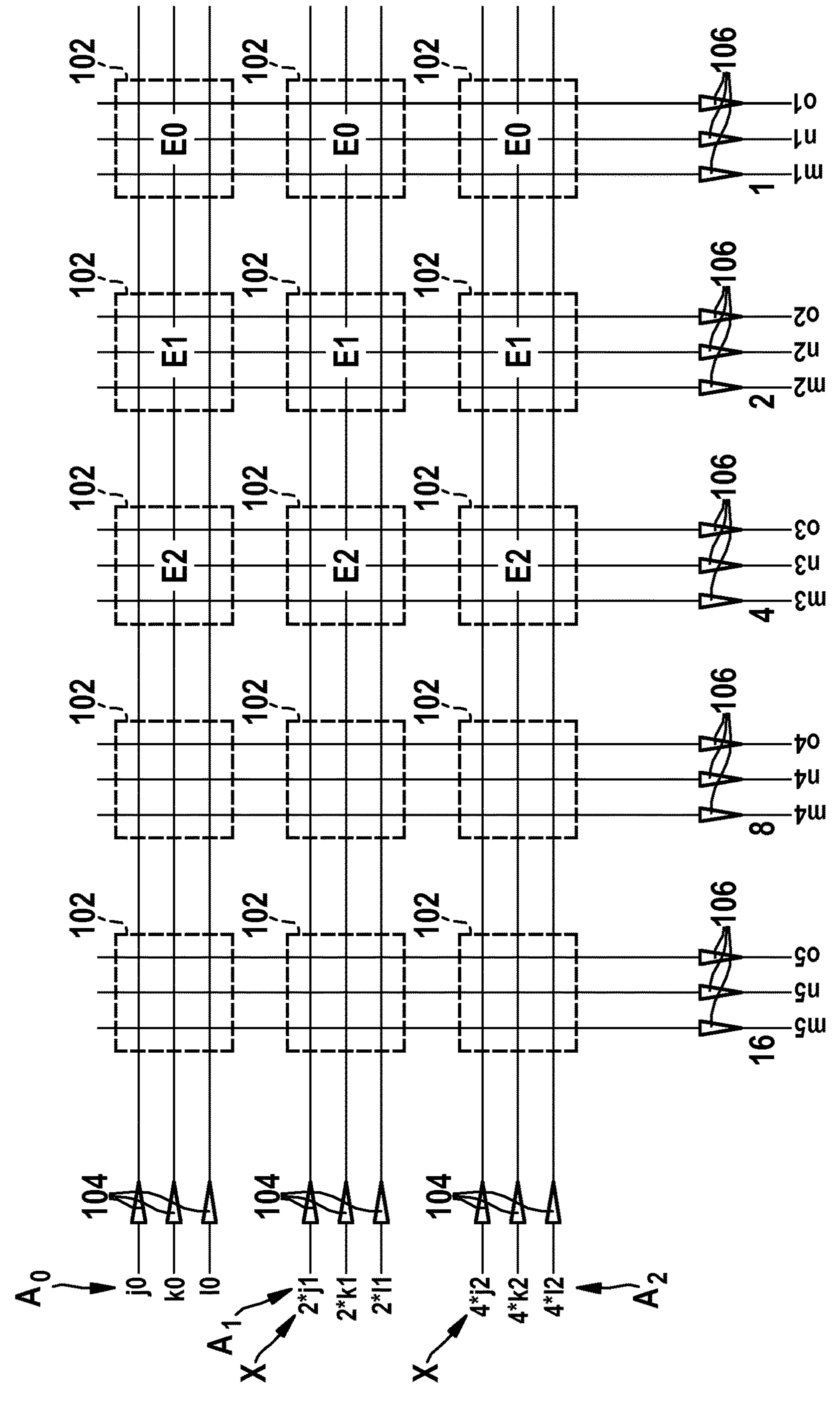
FIG. 7 shows an assignment of matrices in the memristor array.

This may be avoided if in the assignment of matrices E0, E1, E2 for the programming of memristor arrays 102 in the rows of matrix array 100 is shifted in such a way that matrices E0, E1, E2 are situated one below the other as depicted in FIG. 7.

In this case, the change of the assignment is corrected by an adapted voltage. The shifting of the assignment in one row to the right generates an error with the factor 2 in all involved matrices. This is compensated for by increasing the input voltages at the rows by the factor 2 for each shift by one memristor array 102 to the right. Instead of a multiplication by a factor by multiplying, it is possible to simply carry out a division with the aid of a voltage splitter starting from a supply voltage. A shift by one position is corrected once, a shift by two positions is corrected twice. This results in the activation of the groups including input values [j0, k0, l0], 2*[j1, k1, l1] and 4*[j2, k2, l2].

The necessary resolution of the analog-to-digital converters is calculated for values X of the factor at the input as follows:

$$\sum_{0}^{rows} X * Y * Z$$

Y and Z being maximum values for states of the memristors, i.e., for a resolution of n bits: Y, Z=2n−1

In the example with 1 bit memristors Z=1. The input values at the rows also have 1 bit, thus Y=1.

For the matrix of the dimension 3×3 including 1 bit memristors and 3 bit input values, i.e., 1 bit per row, the number of the states the analog-to-digital converter must resolve is 21.

Figure 8:
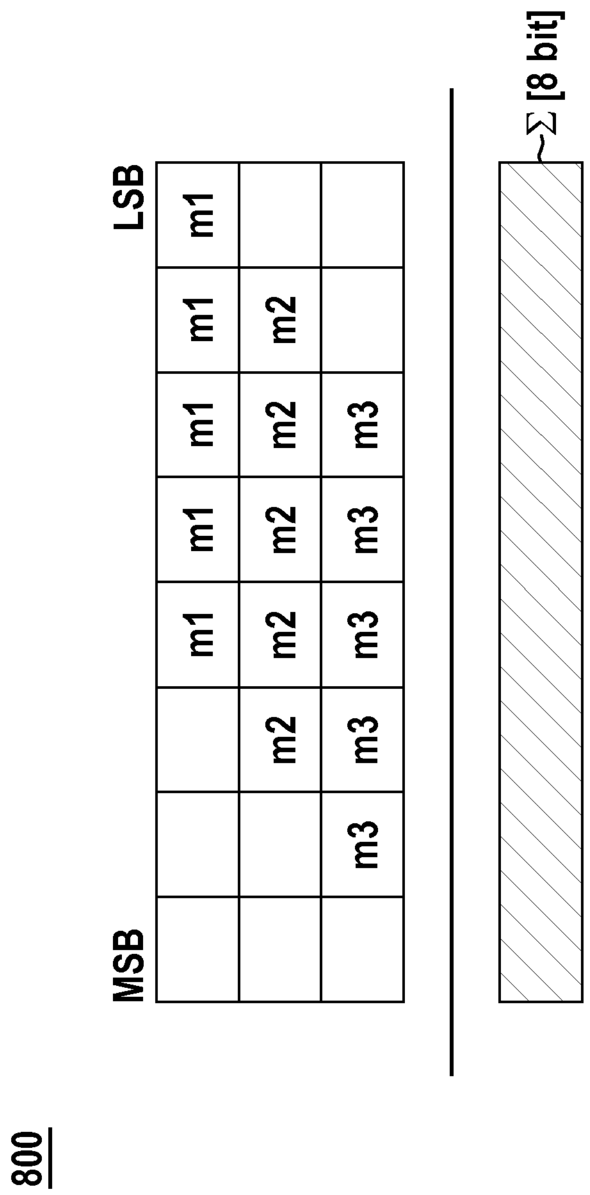
FIG. 8 shows a third calculation diagram, in accordance with an example embodiment of the present invention.

FIG. 8 represents a third calculation diagram 800. The implementation of the calculation according to third calculation diagram 800 further optimizes the previously described approach. In contrast to first calculation diagram 300, only first digitized result m1, second digitized result m2 and third digitized result m3 are arranged. In contrast to first calculation diagram 300, the digitized results have the same bit lengths. The remainder of the approach is as described for first calculation diagram 300.

The required resolution of the analog-to-digital converters results essentially from the achievable numerical range during the matrix operations.

In one aspect of the present invention, it is provided that subtotals are diverted. Should the numerical range required for a matrix operation be greater than the resolution of the available analog-to-digital converter allows, then subtotals may, for example, be diverted.

The number of the overall required analog-to-digital converters increases in this case, the resolution is reduced. One exemplary implementation is apparent in FIG. 9.

In contrast to the implementation previously described with reference to FIG. 7, one tap each for one analog-to-digital converter 106 each is situated at each of the column lines between the second row and the third row of matrix array 100. A sequence of the switching of column lines to ground and applying voltage to the row lines may be selected in such a way that per column line current flows through only one of the taps that are situated at this column line. This column line may then be continuously designed without adversely affecting the total current. To analogically determining the total current, the column line may be preferably permanently electrically disconnected at the point of the diversion between the memristor arrays of the third row and the second row. Resultant analog subtotals are detected by the taps and subsequently digitally added.

Groups including the output values that indicate the analog subtotals of the third row are identified with [m5, n5, o5], [m4, n4, o4], [m3, n3, o3], [m2, n2, o2], [m1, n1, o1]. Groups including the output values that indicate the analog subtotals of the first and of the second row are identified with [r5, s5, t5], [r4, s4, t4], [r3, s3, t3], [r2, s2, t2], [r1, s1, t1].

Figure 10:
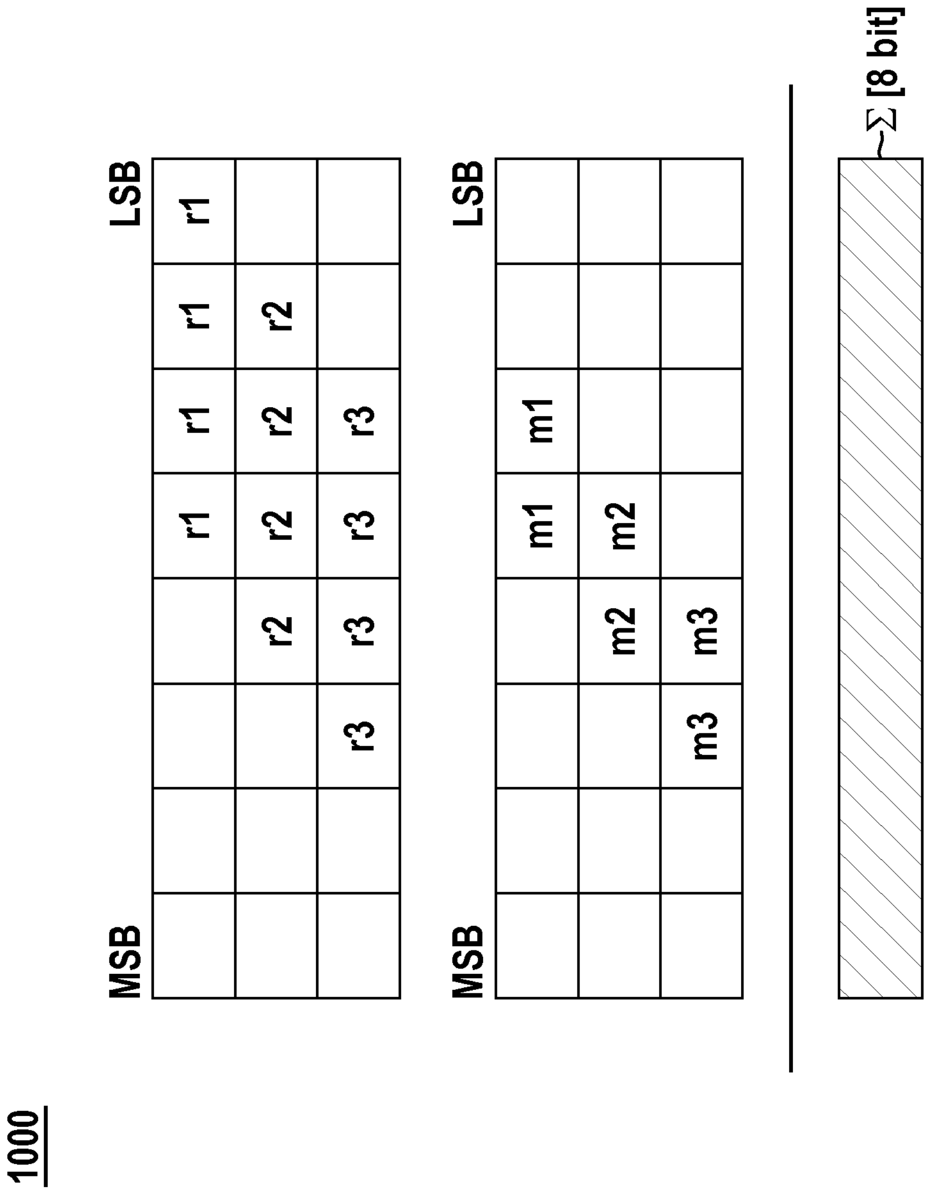
FIG. 10 shows a fourth calculation diagram, in accordance with an example embodiment of the present invention.

The remainder of the approach corresponds to the previously described approach, calculation diagram 1000 depicted by way of example in FIG. 10 for scalar j being used for the calculation of scalars j, k, l.

Output values r1, r2, r3 assigned to scalar j are situated in this sequence row by row at the LSB of sum Σ starting with output value r1. Output value r1 with its LSB is situated at the LSB of sum Σ. The following output values with their LSB are shifted to be situated in the following rows in each case by one further position toward the MSB. Output values m1, m2 and m3 assigned to scalar j are shifted to be situated with respect to the LSB of sum Σ by two bits toward the MSB of sum Σ, starting with output value m1. The following output values with their LSB are in the following rows shifted to be situated by one further position each toward the MSB. The sum calculation takes place column by column as previously described.

In the example, the analog-to-digital converters that take the third row into account require a resolution of 2 bits. The analog-to-digital converters that do not take the third row into account require a resolution of 4 bits.

Figure 11:
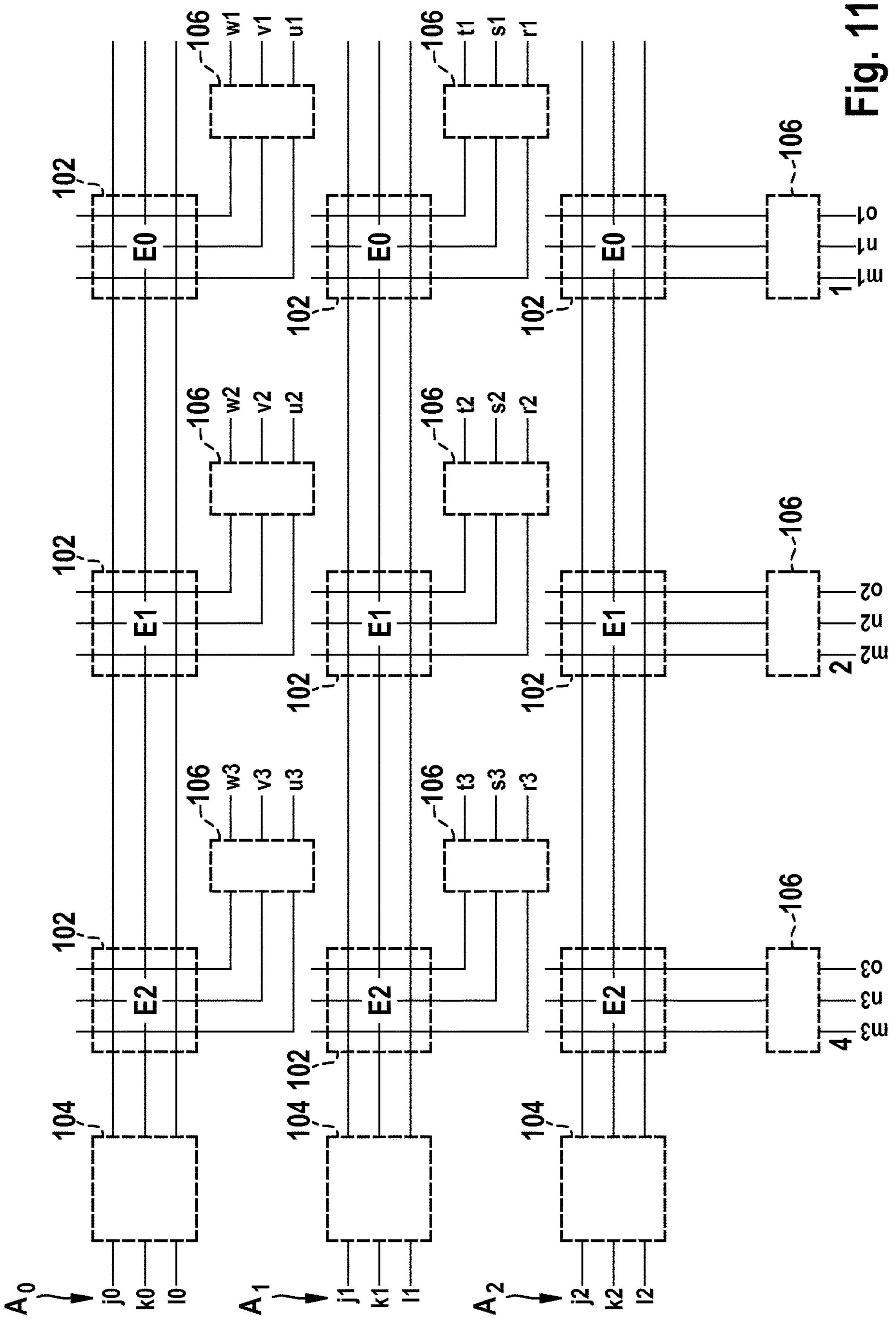
FIG. 11 schematically shows a memristor array including additional diversions, in accordance with an example embodiment of the present invention.

The diverting of such analog subtotals may take place at various points. In FIG. 11, another division is depicted, in which each subtotal is diverted. If necessary, the factor of the voltages at the rows may be adapted or omitted if this is taken into account in the further digital offsetting of the subtotal.

Figure 9:
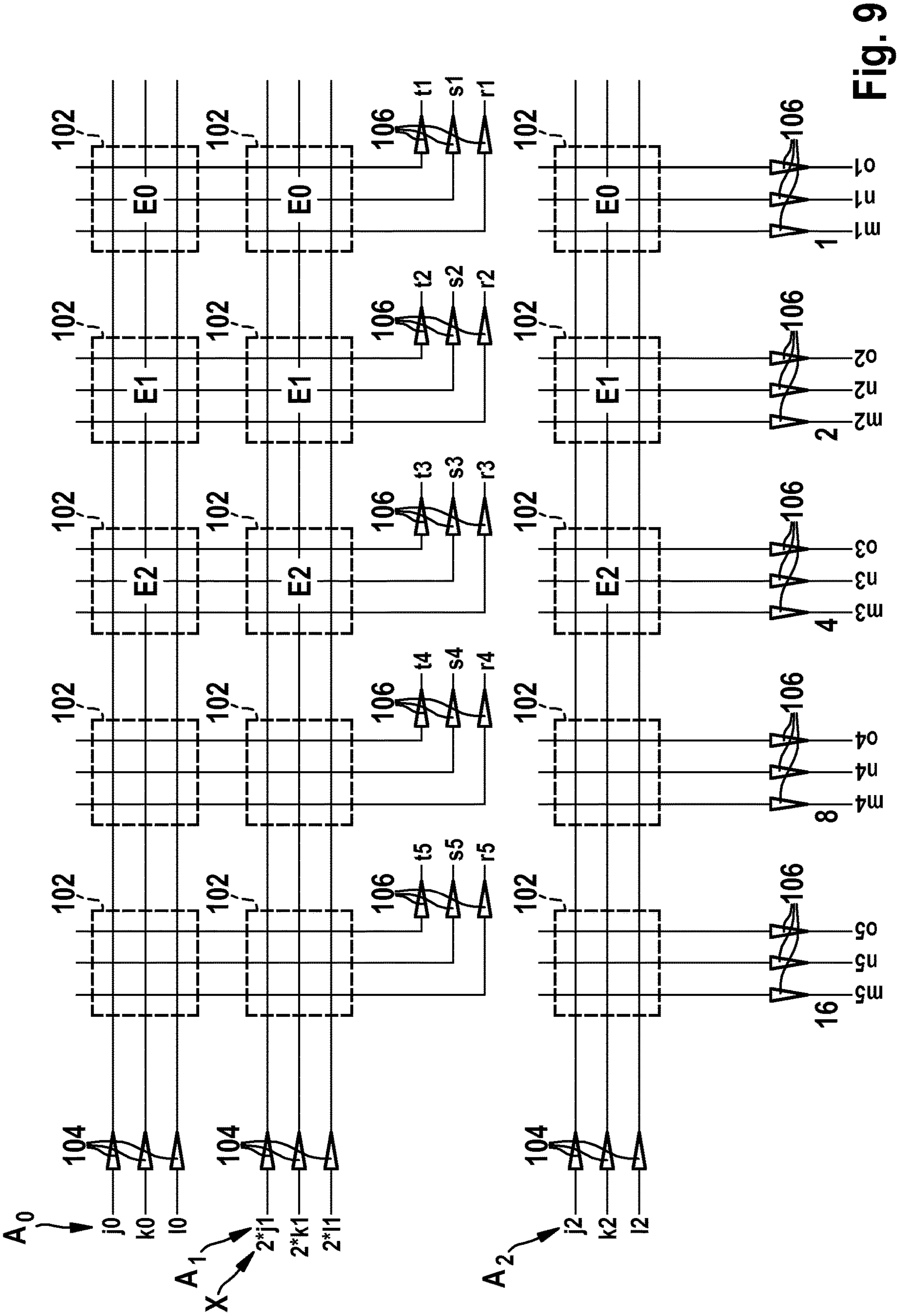
FIG. 9 schematically shows a memristor array including diversions, in accordance with an example embodiment of the present invention.

In contrast to the arrangement previously described with reference to FIG. 9, only nine memristor arrays 102 are situated in a matrix of the dimension 3×3. In addition, analog-digital converters 106 are situated in diversions between the first column and the second column of matrix array 100.

Groups including the output values that indicate the subtotals of the third row are identified with [m3, n3, o3], [m2, n2, o2], [m1, n1, o1]. Groups including the output values that also take the second row but not the first and the third row into account are identified with [r3, s3, t3], [r2, s2, t2], [r1, s1, t1]. Groups including the output values that take only the first row into account are identified with [u3, u3, u3], [u2, u2, u2], [u1, v1, w1]. The same column line is assigned outputs marked by j, r and u, with k, s and v, with l, r and w.

A sequence of the switching of column lines to ground and applying voltage to the row lines may be selected in such a way that current flows through only one tap per column line. The column line may then be continuously designed at the tap without adversely affecting the calculation of the total current. To determine the total current, the column line may be permanently electrically disconnected at the point of the diversion between the memristor arrays of the third row and the second row.

Figure 12:
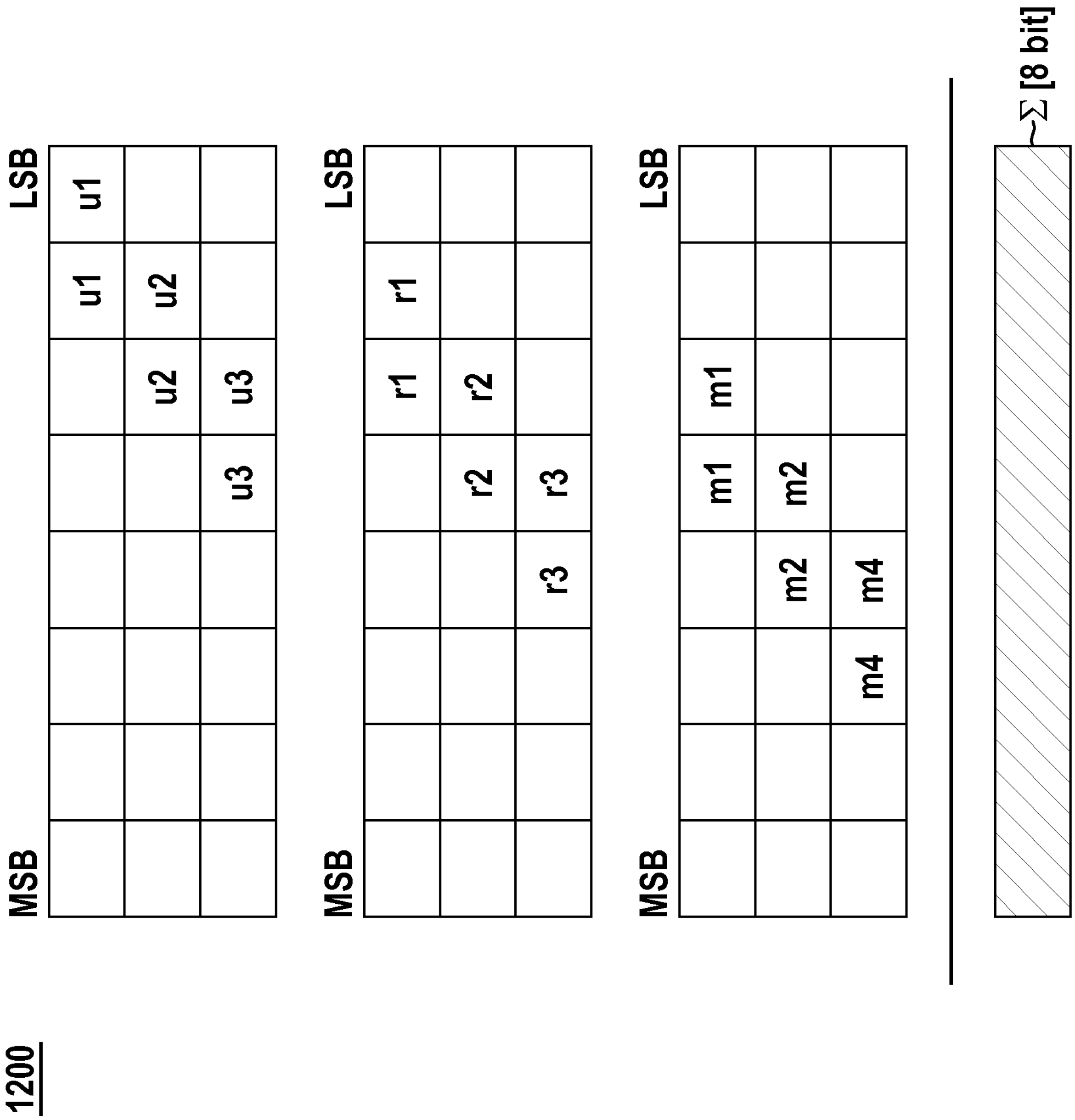
FIG. 12 shows a fifth calculation diagram, in accordance with an example embodiment of the present invention.

The remainder of the approach corresponds to the previously described approach, calculation diagram 1200 depicted by way of example in FIG. 12 for scalar j being used for the calculation of scalars j, k, l.

The row voltages when applied to the row lines are always the same. The previously necessary factor, in the example, 2 or 4, is implemented in that the results of the analog-to-digital converters are superimposed at another bit position in the register.

The output values between the first row and the second row are situated starting with the LSB of output value u1 at the LSB of sum Σ. Output values u2 and u3 are shifted to be situated in following rows each by one further position toward the MSB of sum Σ.

The output values between the second row and the third row are shifted starting with the LSB of output value r1 to be situated with respect to the LSB of sum Σ already by one position toward the MSB of sum Σ. Output values r2 and r3 are shifted to be situated in the following rows each by one further position toward the MSB of sum Σ.

The output values after the third row are shifted starting with the LSB of output value m1 to be situated with respect to the LSB of sum Σ already by two positions toward the MSB of sum Σ.

Output values m2 and m3 are shifted to be situated in the following rows each by one further position toward the MSB of sum Σ.

In the case of the first and the third row, it is even possible that both analog-to-digital converters superimpose their result into the same subtotal.

The summation for the result takes place column by column as described.

In this arrangement, only analog-to-digital converters having a resolution of 2 bits are necessary. These analog-to-digital converters may be made up of merely two comparators. These analog-to-digital converters may operate all the way into the GHz range.

A further aspect relates to an increase in the resolution of the memristors to 2 bits. This means that multiple states are programmed into one memristor. This is taken into account in the decomposition of the matrix similarly to the described matrix operation with a 1 bit decomposition.

This means, 2 bit values are represented in such a way that two bits each, in the example, the bits 0 and 1, the bits 2 and 3, . . . are combined. By replacing the variables in the matrix operation with the following $$a_0 = \mathrm{bit}_0 * 2^0 + \mathrm{bit}_1 * 2^1$$
$$a_1 = \mathrm{bit}_2 * 2^2 + \mathrm{bit}_3 * 2^3$$
$$a_2 = \mathrm{bit}_4 * 2^4 + \mathrm{bit}_5 * 2^5$$
$$\ldots$$

are $$a_0 = 2^0(\mathrm{bit}_0 + \mathrm{bit}_1 * 2^1)$$
$$a_1 = 2^2(\mathrm{bit}_2 + \mathrm{bit}_3 * 2^1)$$
$$a_2 = 2^4(\mathrm{bit}_4 + \mathrm{bit}_5 * 2^1)$$
$$\ldots$$

Similar to the approach with a 1 bit decomposition, the 2 bit matrix results in $$\left(2^0\begin{bmatrix} a_0 & b_0 & c_0 \\ d_0 & e_0 & f_0 \\ g_0 & h_0 & i_0 \end{bmatrix} + 2^2\begin{bmatrix} a_1 & b_1 & c_1 \\ d_1 & e_1 & f_1 \\ g_1 & h_1 & i_1 \end{bmatrix} + 2^4\begin{bmatrix} a_2 & b_2 & c_2 \\ d_2 & e_2 & f_2 \\ g_2 & h_2 & i_2 \end{bmatrix}\right) *$$

-continued $$\left(2^0\begin{bmatrix} j_0 \\ k_0 \\ l_0 \end{bmatrix} + 2^1\begin{bmatrix} j_1 \\ k_1 \\ l_1 \end{bmatrix} + 2^2\begin{bmatrix} j_2 \\ k_2 \\ l_2 \end{bmatrix}\right) =$$

$$E_0A_02^0 + E_0A_12^1 + E_0A_22^2 + E_1A_02^1 + E_1A_12^3 + E_1A_22^4 +$$
$$E_2A_02^4 + E_2A_12^5 + E_2A_22^6 = 2^0(E_0A_02^0 + E_0A_12^1 + E_0A_22^2) +$$
$$2^2(E_1A_02^0 + E_1A_12^1 + E_1A_22^2) + 2^4(E_2A_02^0 + E_2A_12^1 + E_2A_22^2$$

The implementation of these equation terms into a memristor matrix also takes place similarly to matrix array 100 for the 1 bit matrix operation.

Figure 13:
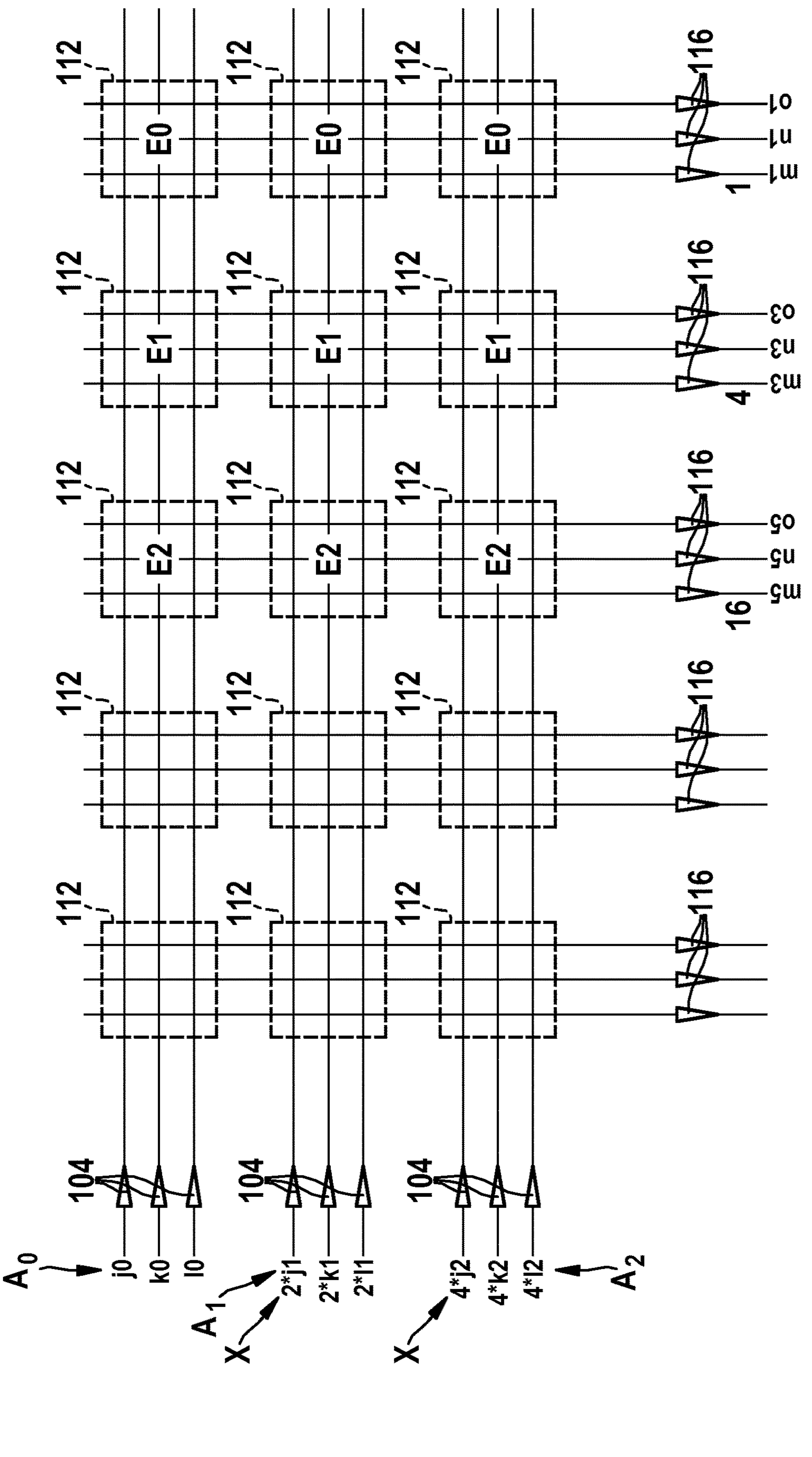
FIG. 13 schematically shows a further memristor array, in accordance with an example embodiment of the present invention.

This implementation is illustrated in FIG. 13 based on the description of matrix array 100, which has been described with reference to FIG. 7. The array, in particular, of matrices E0, E1, E2 and the factor 2 in input values j1, k1, l1 and the factor 4 in input values j2, k2, l2 are as previously described.

In contrast to the array illustrated for FIG. 7, the changed factors are taken into account before the terms. Output values m1, . . . o5 of the three right-hand columns of the matrix used in the example, are marked accordingly. This arrangement places a high demand on the resolution implemented in analog-to-digital converter 116.

The necessary resolution of analog-to-digital converters 116 is calculated for values X as in the example with 2 bit memristors where Z=4 and Y=1 from $$\sum\nolimits_0^{Rows} X * Y * Z$$

For the matrix of the dimension 3×3 including 2 bit memristors and 3 bit input values, i.e., only 1 bit per row of matrix array 100, the number of states needed to be resolved by analog-to-digital converter 116 is 84.

Figure 14:
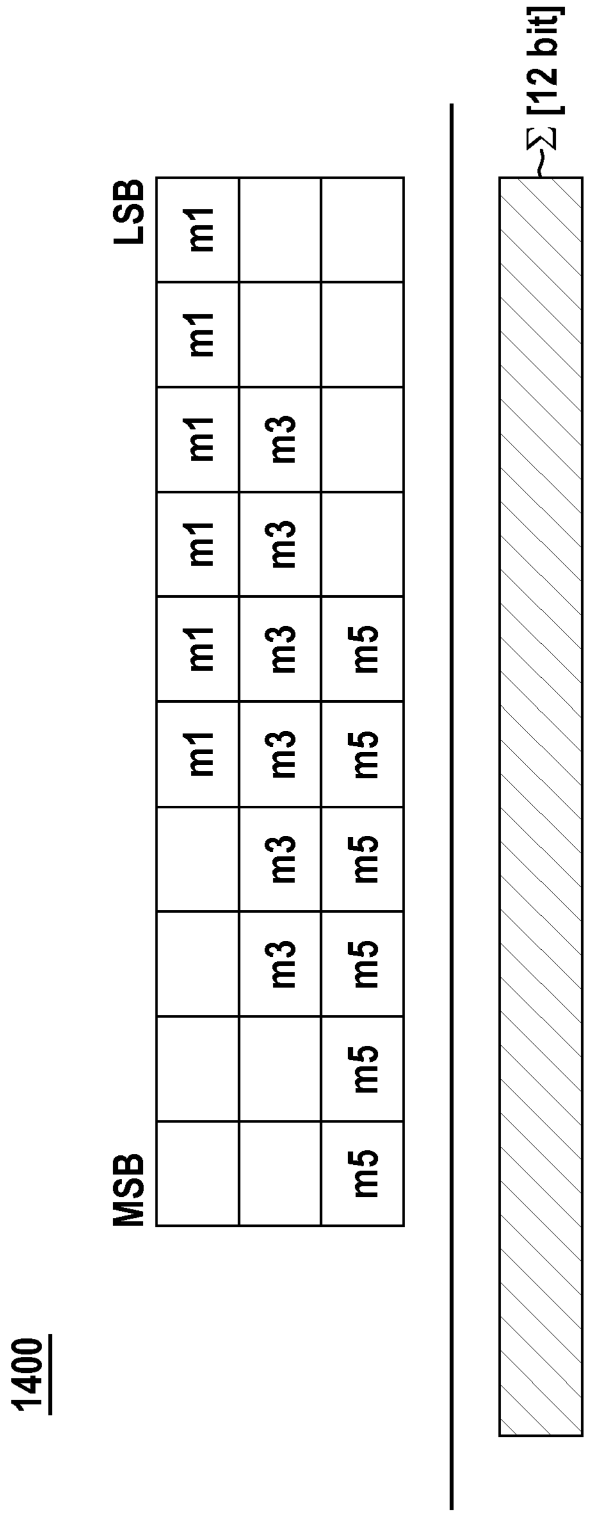
FIG. 14 shows a sixth calculation diagram, in accordance with an example embodiment of the present invention.

Calculation diagram 1400 illustrated in FIG. 14 takes these changes into account, for example, for all scalars j, k, 1 by a 12 bit sum Σ, which is determined as a function of a first output variable m1, of a second output variable m3 and of a third output variable m5. For this purpose, first output variable m1 starting with its LSB is situated at the LSB of sum Σ. Second output variable m3 is situated in a further row starting with its LSB shifted by two positions toward the MSB of sum Σ. Third output variable m5 is situated in a further row starting with its LBS shifted by four positions toward sum Σ. The determination of sum Σ takes place column by column.

The same procedure is applied for increasing the resolution of the memristors and the input values.

For this purpose, the previously used decomposition is changed by a vector decomposition with factors $2^0$, $2^2$, $2^4$ and with the substitution $$a_0 = \text{bit}_0 * 2^0 + \text{bit}_1 * 2^1$$
$$a_1 = \text{bit}_2 * 2^2 + \text{bit}_3 * 2^3$$
$$a_2 = \text{bit}_4 * 2^4 + \text{bit}_5 * 2^5$$
$$\ldots$$

as follows:

$$\left(2^0\begin{bmatrix} a_0 & b_0 & c_0 \\ d_0 & e_0 & f_0 \\ g_0 & h_0 & i_0 \end{bmatrix} + 2^2\begin{bmatrix} a_1 & b_1 & c_1 \\ d_1 & e_1 & f_1 \\ g_1 & h_1 & i_1 \end{bmatrix} + 2^4\begin{bmatrix} a_2 & b_2 & c_2 \\ d_2 & e_2 & f_2 \\ g_2 & h_2 & i_2 \end{bmatrix}\right) *$$

$$\left(2^0\begin{bmatrix} j_0 \\ k_0 \\ l_0 \end{bmatrix} + 2^2\begin{bmatrix} j_1 \\ k_1 \\ l_1 \end{bmatrix} + 2^4\begin{bmatrix} j_2 \\ k_2 \\ l_2 \end{bmatrix}\right) =$$

$$E_0A_02^0 + E_0A_12^2 + E_0A_22^4 + E_1A_02^2 + E_1A_12^4 + E_1A_22^6 +$$
$$E_2A_02^4 + E_2A_12^6 + E_2A_22^8 = 2^0(E_0A_02^0 + E_0A_12^2 + E_0A_22^4) +$$
$$2^2(E_1A_02^0 + E_1A_12^2 + E_1A_22^4) + 2^4(E_2A_02^0 + E_2A_12^2 + E_2A_22^4$$

The implementation of these equation terms in a memristor matrix takes place similarly to the implementation described according to FIG. 13.

Figure 15:
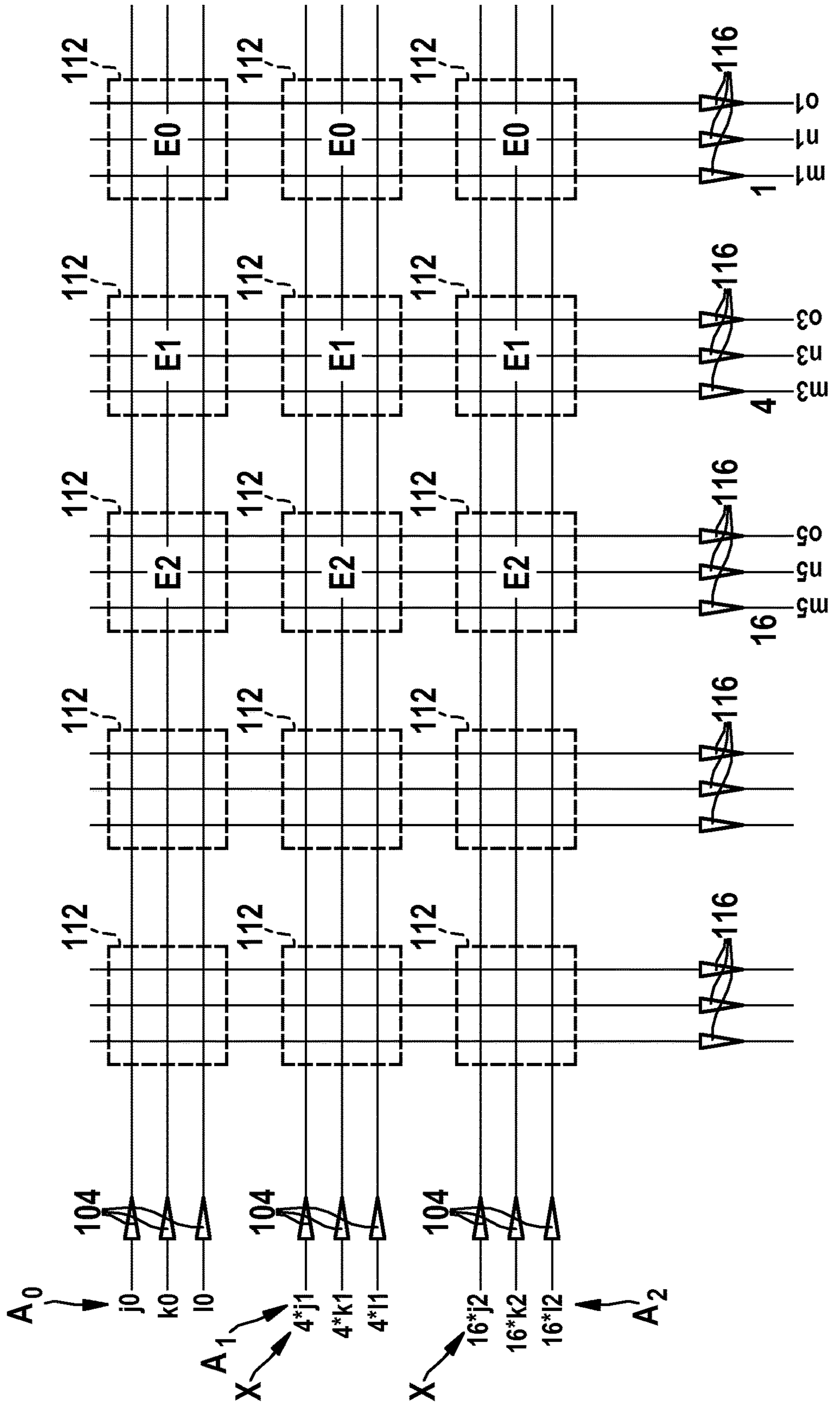
FIG. 15 schematically shows a further memristor array, in accordance with an example embodiment of the present invention.

Resulting matrix array 100 is illustrated in FIG. 15. The voltage at inputs j1, k1, l1 is now applied with a factor 4 in contrast to the previous implementation. The voltage at inputs j2, k2, l2 is now applied with a factor 16 in contrast to the previous implementation.

The changed factors before the terms result in demands on analog-to-digital converters 116 with respect to the resolution. In the 1 bit matrix including 1 bit memristors and 3 bit input values, Z=1 and Y=1. The necessary resolution of analog-to-digital converters 116 is calculated in this example with 2 bit memristors and 6 bit input values, i.e., where Z=2 and Y=2. For the matrix illustrated in the example of the dimension 3×3 including 2 bit memristors and 6 bit input values, which are 2 bits per row, the number of states need to be resolved by analog-to-digital converter 116 is 1008.

Figure 16:
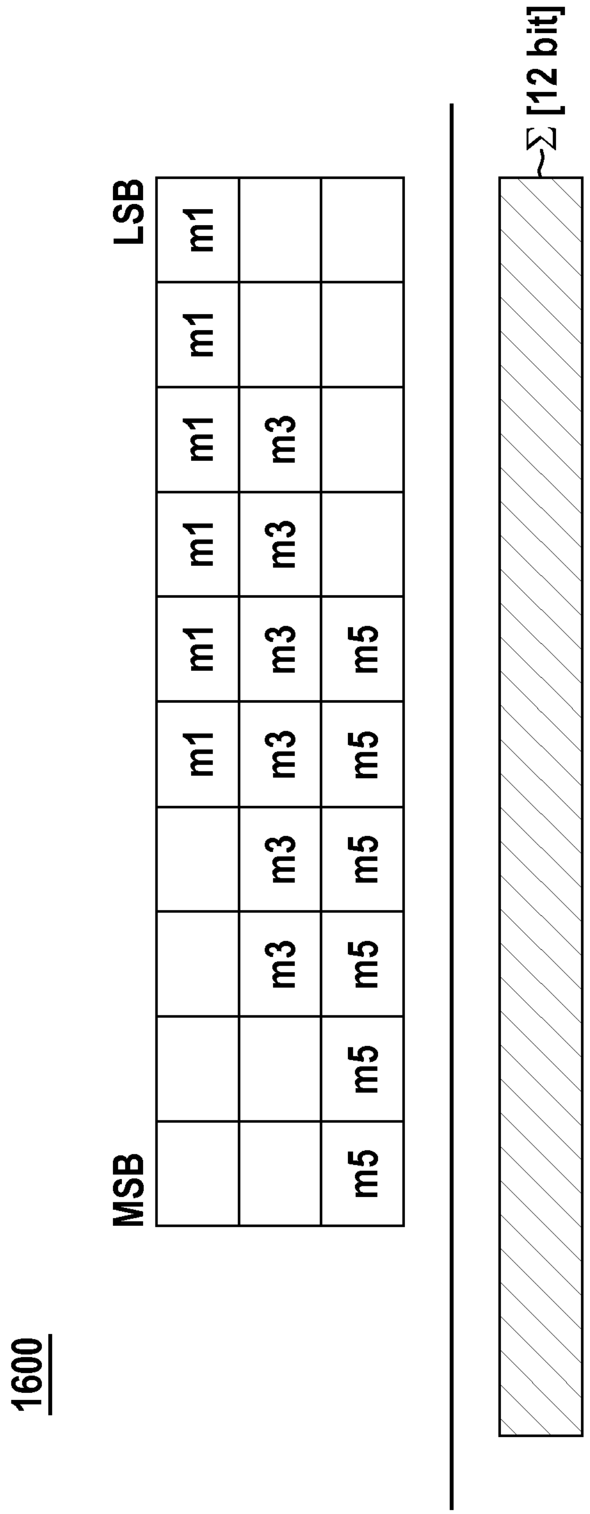
FIG. 16 shows a seventh calculation diagram, in accordance with an example embodiment of the present invention.

Calculation diagram 1600 illustrated in FIG. 16 takes these changes into account, for example, for all scalars j, k, I by a 12 bit sum Σ, which is determined as a function of a first output variable m1, of a second output variable m3, and of a third output variable m5. For this purpose, first output variable m1 is situated starting with its LSB at the LSB of sum Σ. Second output variable m3 is situated in a further row starting with its LSB shifted by two positions toward the MSB of sum Σ. Third output variable m5 is situated in a further row starting with its LSB shifted by four positions toward the MSB of sum Σ. The determination of sum Σ takes place column by column.

The classic calculation of a n*n matrix requires $n^2$ multiplications as well as $n^2$-n additions. In the case of an 8×8 matrix, this would be 64 multiplications and 56 additions with 8 bit input values, i.e., with a 16 bit width. Approximately 118 cycles are required.

The provided method requires 3*8 shift operations of the input values and 8*8 additions of the output values as well as 64 AD conversions with 3 bit resolution. Due to the high degree of parallelization, however, only approximately 10 cycles are required.

The method is applicable on matrices of other sizes and resolutions.

Figure 18:
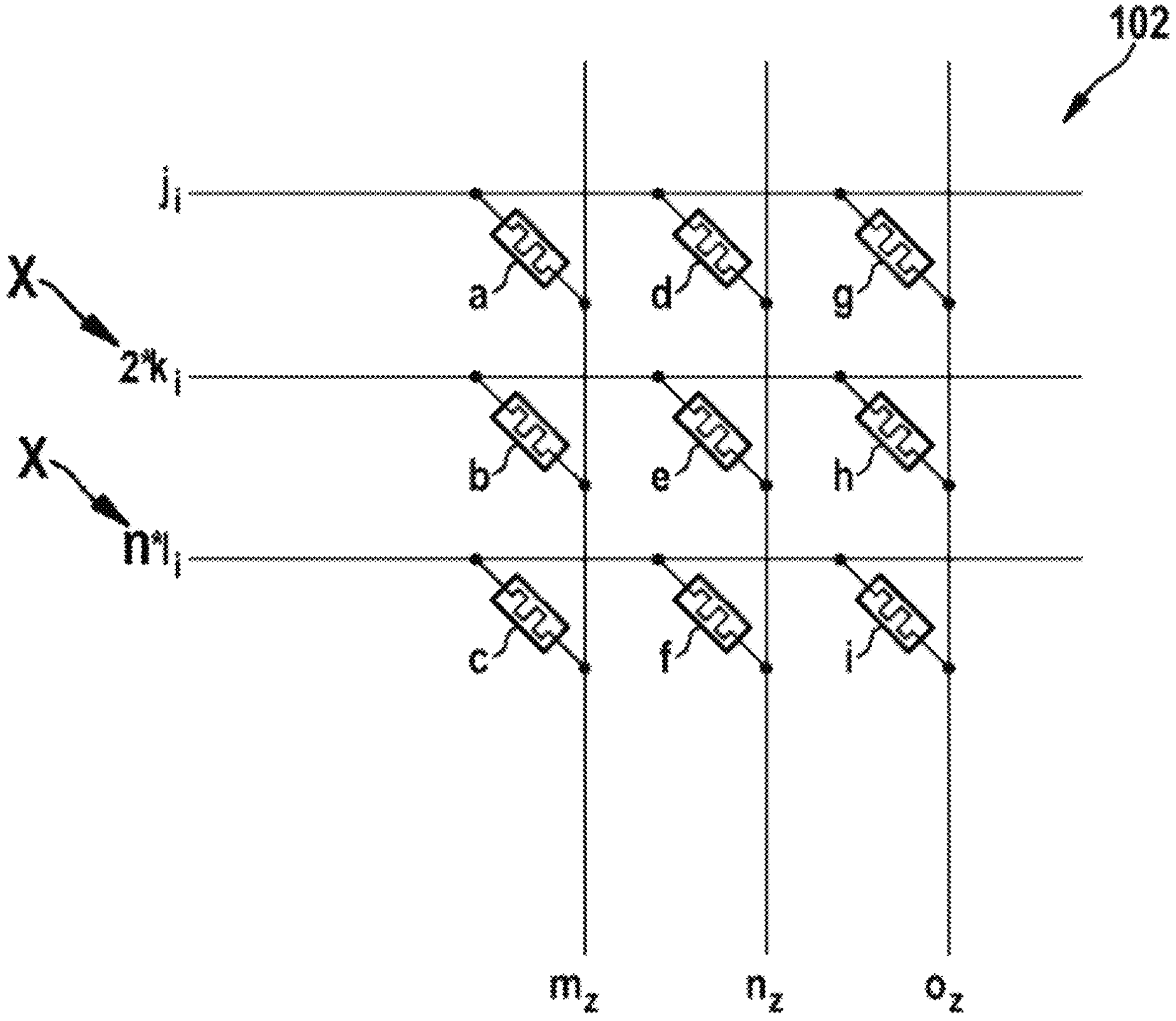
FIG. 18 shows an example memristor array with an assignment of voltages at different factors in accordance with an example embodiment of the present invention.

As shown in FIG. 18, the different factors of the applied voltages can be provided between voltages applied to different memristors of the same memristor array 102. For example, a second voltage applied at input kdi can be vary by a factor of 2 compared to a first voltage applied at input $j_i$, and a third voltage at input $I_i$ can vary by a further factor n.

Figure 17:
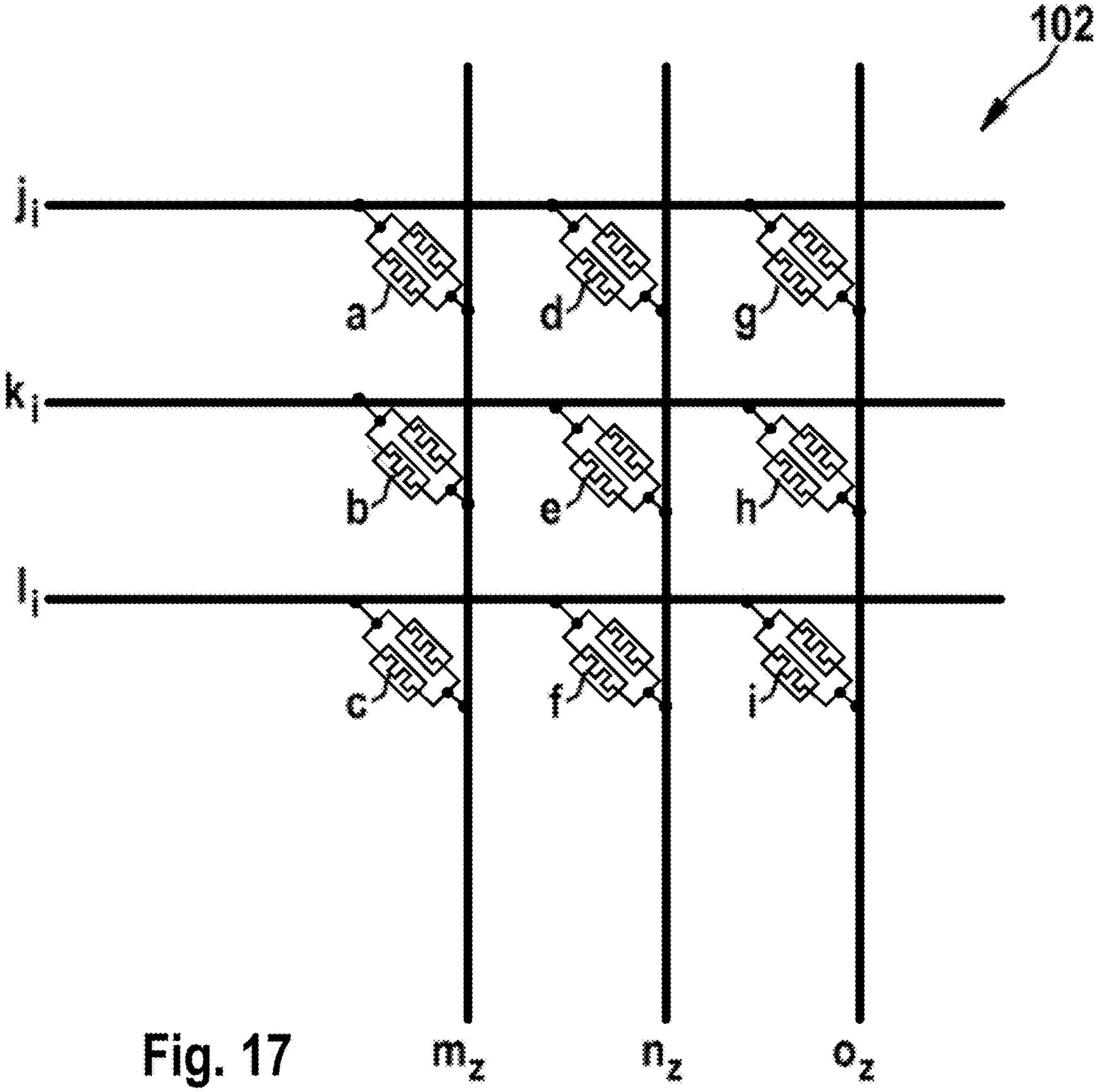
FIG. 17 schematically shows a memristor array, in accordance with an alternative example embodiment of the present invention, in which, at a node of a row and a column of a matrix array, there are situated two memristors that are variable in directions opposite one another with respect to their charge-dependent resistance values.

In one aspect, a memristor array is provided, in which two memristors are situated at a node of a row and a column of matrix array 100, which are variable in the direction opposite one another with respect to their charge-dependent resistance values, for example as shown in FIG. 17. These may be programmed with the same voltage at the same time with inverted weights. Thus, two current value calculations may be carried out simultaneously. In this case, however, one of the two calculations uses inverted weights. As a result, zeros are counted by the analog-to-digital converter, which may be taken into account either in the interpretation of the results or in the algorithm. This redundancy may, for example, be used to check the plausibility of the results.

What is claimed is:

1. A method for implementing a matrix operation, the method comprising:

determining a first digital result as a function of a first analog addition using a first memristor array; and determining a second digital result as a function of a second analog addition using a second memristor array;

wherein:

a first voltage is applied at a first memristor of the first memristor array, the application of the first voltage at the first memristor being made selectively at a memristor level without global application of the first voltage to an entirety of the first memristor array;

at least partially in a temporally overlapping manner with the application of the first voltage at the first memristor:

a second voltage is applied, selectively at the memristor level, at a second memristor;

the first voltage is applied, selectively at the memristor level, at a third memristor of the second memristor array; and the second voltage or a third voltage is applied, selectively at the memristor level, at a fourth memristor of the second memristor array;

a first total current is detected at a first output of the first memristor array, which characterizes a current flow through the first memristor and through the second memristor;

a second total current is detected at a second output of the second memristor array, which characterizes a current flow through the third memristor and through the fourth memristor; and the first voltage and the second voltage differ by a factor which is defined as a function of a resolution of a plurality of digital-to-analog converters used for generating the first and second voltages or as a function of a bit factor decomposition underlying the matrix operation.

2. The method as recited in claim 1, wherein the first digital result is determined as a function of the first total current which provides a first analog result, the second digital result is determined as a function of the second total current which provides a second analog result, the first and second analog results being determined at least partially in a temporally overlapping manner to each other.

3. The method as recited in claim 1, wherein the first voltage is defined as a function of a first element of a first matrix, the second voltage is defined as a function of a second element of the first matrix, a first resistance value of the first memristor is defined as a function of a first element of a second matrix, a second resistance value of the second memristor is defined as a function of a second element of the second matrix, and the first and second digital results are used to characterize a scalar product of the first and second matrices.

4. The method as recited in claim 3, wherein at least one resistance value of a memristor is programmed as a function of one element of the second matrix.

5. The method as recited in claim 3, wherein resistance values of at least two memristors are defined or programmed as a function of one element of the second matrix.

6. The method as recited in claim 3, wherein the first memristor, second memristor, third memristor, and fourth memristor are situated in a matrix array, the second matrix or a plurality of second matrices define an array of resistance values for the first memristor, the second memristor, the third memristor, and the fourth memristor, and, with respect to each of one or more of the first memristor, second memristor, third memristor, and fourth memristor in the matrix array, the respective memristor includes or is programmed with a respective one of the resistance values whose position in the array of resistance values corresponds to a respective position of the respective memristor in the matrix array with respect to indices.

7. The method as recited in claim 6, wherein at least two groups of memristors include or are programmed with respective ones of the resistance values, which are defined according to elements of a same one of the second matrix or of the plurality of second matrices.

8. The method as recited in claim 6, wherein at least a portion of memristors of at least two groups of memristors in the matrix array are used to determine a same one of the first total current and the second total current.

9. The method as recited in claim 8, wherein at least one of the memristors from one of the at least two groups of memristors in the matrix array is ignored by memristors of the other of the at least two groups when determining the first and second total currents.

10. The method as recited in claim 1, wherein the first voltage is an analog signal, which is generated by a first one of the plurality of digital-to-analog converters as a function of a digital signal, which is defined by a first element of a first matrix, and the second voltage is an analog signal, which is generated by a second one of the digital-to-analog converters as a function of a digital signal, which is defined by a second element of the first matrix.

11. The method as recited in claim 1, wherein the factor is a power of 2.

12. The method as recited in claim 1, wherein the first total current includes at least (a) one first current flowing through the first memristor when the first voltage is applied at the first memristor, and (b) a second current flowing through the second memristor when the second voltage is applied at the second memristor.

13. The method as recited in claim 1, wherein the first voltage is applied at the same time to the first memristor and to the third memristor or the second voltage is applied at the same time to the second memristor and the fourth memristor, the first total current is detected by the first memristor and the second memristor, the second total current is detected by the third memristor and/or the fourth memristor, and an overall result is determined from the first total current and of the second total current.

14. The method as recited in claim 1, wherein the first digital result and the second digital result are obtained as digital signals that define respective values of at least one bit and by respective analog-to-digital converters.

15. The method as recited in claim 1, wherein a plurality of total currents is determined, a plurality of bits being determined as a function of the plurality of total currents, at least one bit, which is defined as a function of one of the plurality of total currents, being added to at least one bit, which is defined as a function of another of the plurality of total currents.

16. The method as recited in claim 15, wherein at least one of the bits in one register is shifted to be situated with respect to a least significant bit of an overall result obtained from the first and second digital results in the direction of the most significant bit of the overall result before the addition with the other bit from another register.

17. The method as recited in claim 15, wherein at least one of the bits in one register is situated before the addition with another bit from another register adjacent to the other bit with respect to a least significant bit of an overall result obtained from the first and second digital results.

18. The method as recited in claim 1, further comprising digitally adding the first digital result and the second digital result.

19. The method as recited in claim 1, wherein the second memristor is part of the second memristor array.

20. A method for implementing a matrix operation using a plurality of memristors, a first memristor array including a first subset of the plurality of memristors and a second memristor array including a second subset of the plurality of memristors, the method comprising:

determining a first digital result as a function of a first analog addition using the first memristor array; and determining a second digital result as a function of a second analog addition using the second memristor array;

wherein:

the determining of the first digital result and of the second digital result is performed by:

applying a first voltage, which is an analog signal generated by a first digital-to-analog converter as a function of a digital signal defined by a first element of a matrix, at a first one of the plurality of memristors; and at least partially in a temporally overlapping manner with the application of the first voltage at the first memristor, applying a second voltage, which is an analog signal generated by a second digital-to-analog converter as a function of a digital signal defined by a second element of the matrix, at a second one of the plurality of memristors; and the first and second voltages differ by a factor which is defined:

as a function of a resolution of the respective digital-to-analog converters; or as a function of a bit factor decomposition underlying the matrix operation.

21. The method as recited in claim 20, further comprising:

detecting a first total current at a first output of the first memristor array, which characterizes a current flow through multiple memristors of the first subset of the plurality of memristors; and detecting a second total current at a second output of the second memristor array, which characterizes a current flow through multiple memristors of the second subset of the plurality of memristors.

22. The method as recited in claim 20, further comprising digitally adding the first digital result and the second digital result.

23. The method as recited in claim 20, wherein the application of the first voltage is to one of the memristors of the first subset of memristors, which is of the first memristor array and is also to one of the memristors of the second subset of memristors, which is of the second memristor array.

24. A non-transitory machine-readable memory medium on which is stored a computer program for implementing a matrix operation, the computer program, when executed by a computer, causing the computer to perform the following steps:

determining a first digital result as a function of a first analog addition using a first memristor array; and determining a second digital result as a function of a second analog addition using a second memristor array;

wherein:

a first voltage is applied at a first memristor of the first memristor array, the application of the first voltage at the first memristor being made selectively at a memristor level without global application of the first voltage to an entirety of the first memristor array;

at least partially in a temporally overlapping manner with the application of the first voltage at the first memristor:

a second voltage is applied, selectively at the memristor level, at a second memristor of the first memristor array;

the first voltage is applied, selectively at the memristor level, at a third memristor of the second memristor array; and the second voltage or a third voltage is applied, selectively at the memristor level, at a fourth memristor of the second memristor array;

a first total current is detected at a first output of the first memristor array, which characterizes a current flow through the first memristor and through the second memristor;

a second total current is detected at a second output of the second memristor array, which characterizes a current flow through the third memristor and through the fourth memristor; and the first voltage and the second voltage differ by a factor which is defined as a function of a resolution of a plurality of digital-to-analog converters used for generating the first and second voltages or as a function of a bit factor decomposition underlying the matrix operation.

25. A device for implementing a matrix operation, comprising:

a digital-to-analog converter arrangement consisting of one digital-to-analog converter or consisting of a plurality of digital-to-analog converters;

a first memristor array;

a second memristor array;

a first analog-to-digital converter; and a second analog-to-digital converter;

wherein:

the device is configured to determine a first digital result as a function of a first analog addition using the first memristor array and the first analog-to-digital converter, and to determine a second digital result as a function of a second analog addition using the second memristor array and the second analog-to-digital converter;

the digital-to-analog converter arrangement is configured to respond to digital signals, which are obtained for performance of the matrix operation, by:

applying a first voltage at a first memristor of the first memristor array, the application of the first voltage at the first memristor being made selectively at a memristor level without global application of the first voltage to an entirety of the first memristor array; and at least partially in a temporally overlapping manner with the application of the first voltage at the first memristor:

applying, selectively at the memristor level, a second voltage at a second memristor of the first memristor array;

applying, selectively at the memristor level, the first voltage at a third memristor of the second memristor array; and applying, selectively at the memristor level, the second voltage or a third voltage at a fourth memristor of the second memristor array;

the first analog-to-digital converter is configured to detect, and convert into the first digital result, a first total current at a first output of the first memristor array, which characterizes a current flow through the first memristor and through the second memristor; and the second analog-to-digital converter is configured to detect, and convert into the second digital result, a second total current at a second output of the second memristor array, which characterizes a current flow through the third memristor and through the fourth memristor; and the first voltage and the second voltage differ by a factor which is defined (a) as a function of a resolution of the one digital-to-analog converter or the plurality of digital-to-analog converters or (b) as a function of a bit factor decomposition underlying the matrix operation.

26. The device as recited in claim 25, wherein the first and second memristor arrays are part of a matrix array.

27. The device as recited in claim 26, wherein at least one of the first memristor array and the second memristor array includes, situated at a node of a row and of a column of the matrix array, two memristors that are variable with respect to their charge-dependent resistance values in directions opposite to one another.

28. The device as recited in claim 25, wherein:

the digital-to-analog converter arrangement consists of the plurality of digital-to-analog converters;

a first one of the plurality of digital-to-analog converters is configured to generate the first voltage; and a second one of the plurality of digital-to-analog converters is configured to generate the second voltage.

29. A device, comprising:

a microprocessor;

a switching unit including a plurality of electrical switches; and a memory including registers;

wherein:

the microprocessor is configured to operate the switches with a switching operation for selective application of voltages, the selective application activating a first device for implementing a matrix operation, the first device including:

a first memristor array;

a second memristor array;

a first analog-to-digital converter; and a second analog-to-digital converter;

the first device is configured to determine a first digital result as a function of a first analog addition using the first memristor array and the first analog-to-digital converter, and to determine a second digital result as a function of a second analog addition using the second memristor array and the second analog-to-digital converter;

the microprocessor is configured to perform the switching operation of the switching unit to:

apply a first voltage of the voltages at a first memristor of the first memristor array, the application of the first voltage at the first memristor being made selectively at a memristor level without global application of the first voltage to an entirety of the first memristor array;

at least partially in a temporally overlapping manner with the application of the first voltage at the first memristor:

apply, at the memristor level, a second voltage of the voltages selectively at a second memristor of the first memristor array;

apply, at the memristor level, the first voltage selectively at a third memristor of the second memristor array; and apply, at the memristor level, the second voltage or a third voltage of the voltages selectively at a fourth memristor of the second memristor array;

a first total current is detectable at a first output of the first memristor array, which characterizes a current flow through the first memristor and through the second memristor;

a second total current is detectable at a second output of the second memristor array, which characterizes a current flow through the third memristor and through the fourth memristor;

a result obtained from the first and second total currents is storable by the microprocessor in the registers; and the first voltage and the second voltage differ by a factor which is defined as a function of a resolution of a plurality of digital-to-analog converters used for generating the first and second voltages or as a function of a bit factor decomposition underlying the matrix operation.

* * * * *